(12) United States Patent
Yen

(10) Patent No.: US 11,261,901 B2
(45) Date of Patent: Mar. 1, 2022

(54) FASTENER

(71) Applicant: Cheng-Hung Yen, Taichung (TW)

(72) Inventor: Cheng-Hung Yen, Taichung (TW)

(*) Notice: Subject to any disclaimer, the term of this patent is extended or adjusted under 35 U.S.C. 154(b) by 168 days.

(21) Appl. No.: 16/119,800

(22) Filed: Aug. 31, 2018

(65) Prior Publication Data

US 2019/0072125 A1 Mar. 7, 2019

(30) Foreign Application Priority Data

Sep. 4, 2017 (TW) .................................. 106130172
May 18, 2018 (TW) .................................. 107117122

(51) Int. Cl.
| | |
|---|---|
| *F16B 35/00* | (2006.01) |
| *F16B 35/06* | (2006.01) |
| *B62K 25/02* | (2006.01) |
| *F16B 41/00* | (2006.01) |
| *F16B 23/00* | (2006.01) |

(52) U.S. Cl.
CPC .............. *F16B 35/06* (2013.01); *B62K 25/02* (2013.01); *F16B 23/00* (2013.01); *F16B 41/005* (2013.01); *B62K 2206/00* (2013.01)

(58) Field of Classification Search
CPC ........ F16B 35/06; F16B 23/00; F16B 41/005; F16B 7/0426; B62K 25/02; B62K 2206/00; B62K 2025/25
See application file for complete search history.

(56) References Cited

U.S. PATENT DOCUMENTS 9,963,190 B1 * 5/2018 Liu ..................... B62K 25/02
2018/0346056 A1 * 12/2018 Adomeit ................ B60B 35/04

FOREIGN PATENT DOCUMENTS

DE  202015005799 U1 * 11/2016 ........... B60B 27/023

* cited by examiner

*Primary Examiner* — Jack W Lavinder
(74) *Attorney, Agent, or Firm* — Birch, Stewart, Kolasch & Birch, LLP

(57) ABSTRACT

A fastener includes a connecting member and a handling member. The connecting member has a first axis and an accommodating space extended along the first axis. The handling member having a second axis is movably disposed in the accommodating space and movable between a first position and a second position. When located at the first position, the handling member is disposed in the accommodating space in a way that the second axis is approximately coaxial with the first axis of the connecting member. When located at the second position, the handling member is positioned on the connecting member in a way that an included angle is provided between the second axis and the first axis so that the handling member can be rotated by an external force to drive the connecting member to rotate at a to-be fastened position.

7 Claims, 29 Drawing Sheets

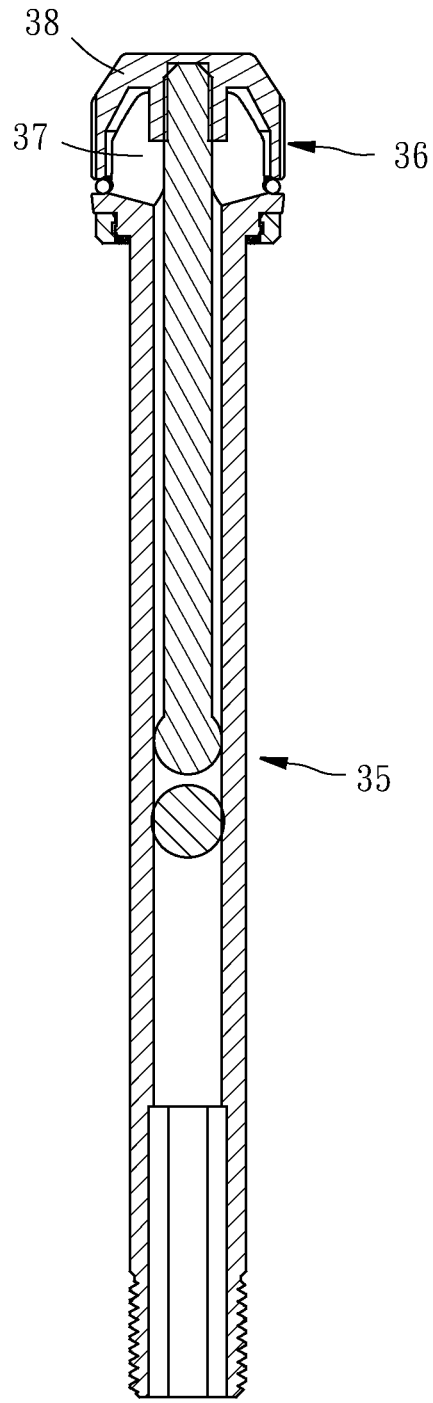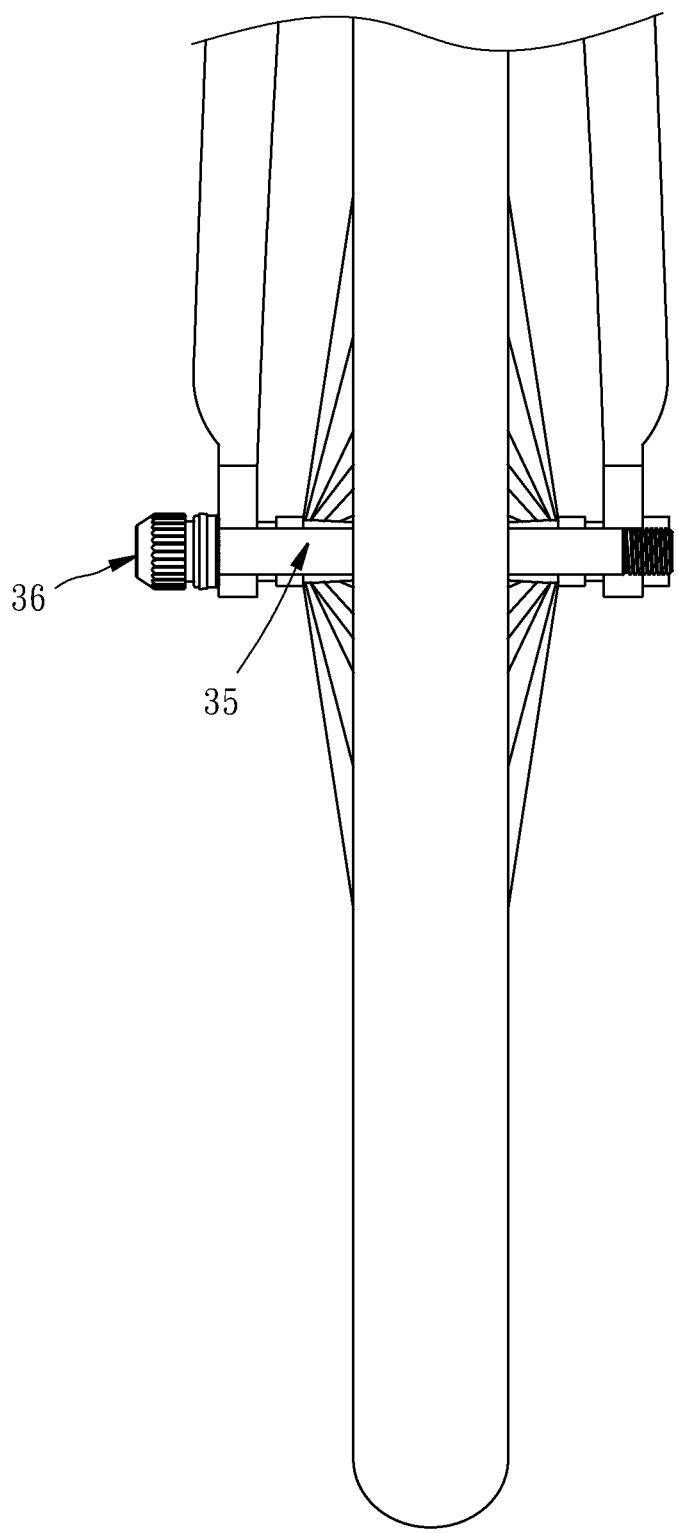
FIG. 19
FIG. 20

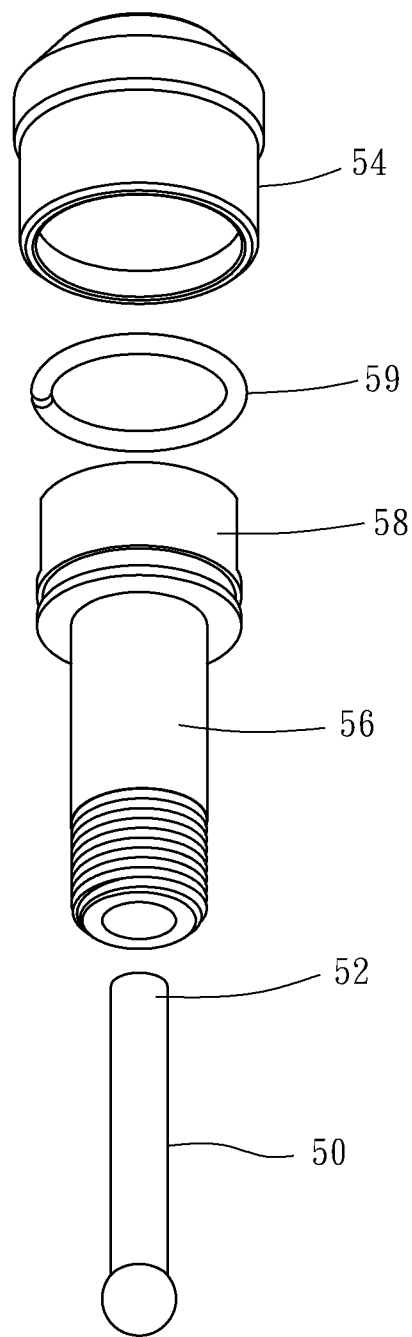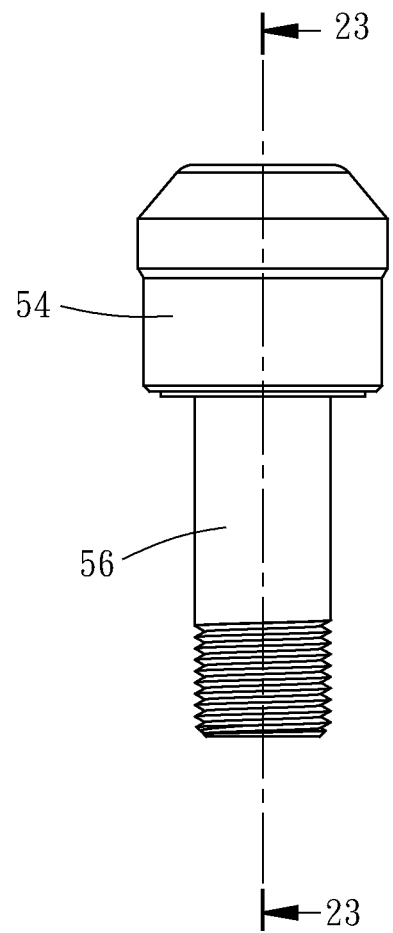
FIG. 21
FIG. 22

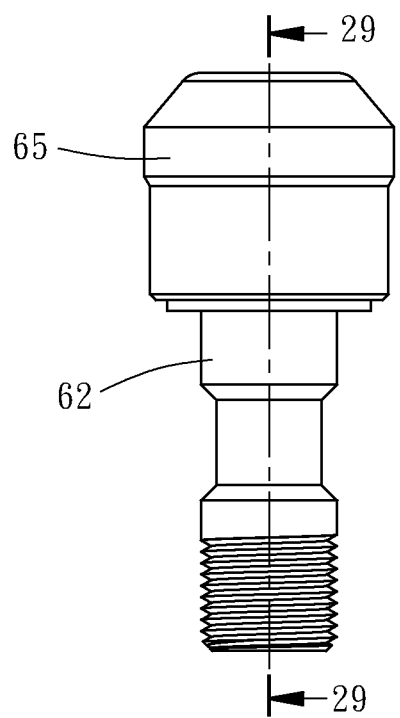
FIG. 28
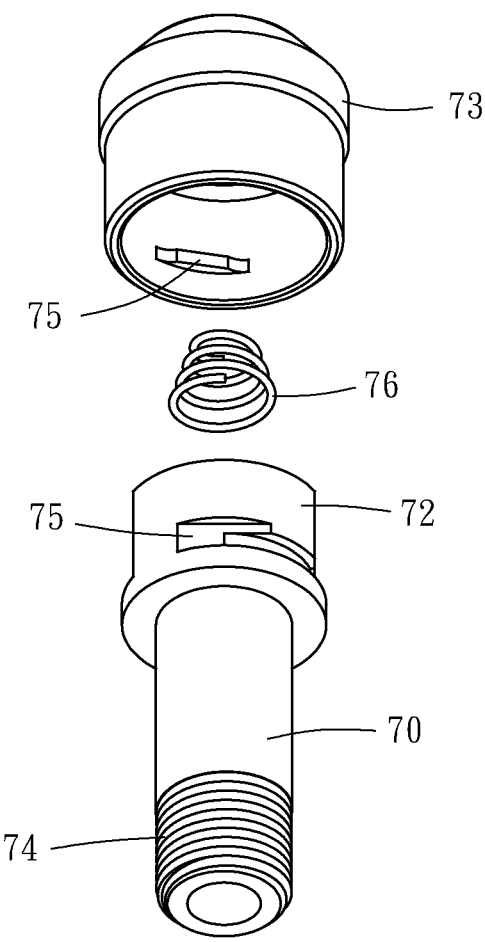
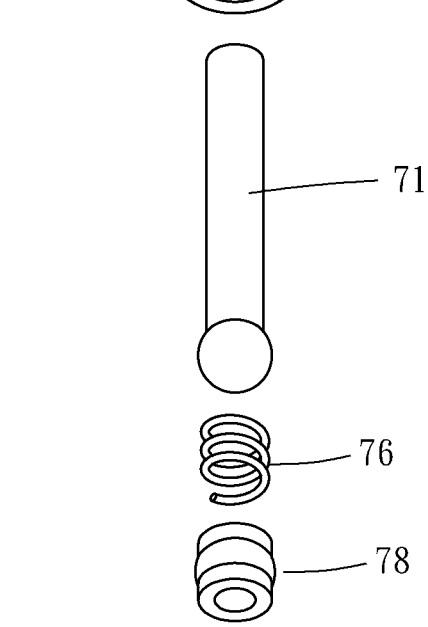
FIG. 29
FIG. 30

FASTENER

BACKGROUND OF THE INVENTION

1. Field of the Invention

The present invention relates to fasteners and more particularly, to a fastener which can be used without use of an extra tool.

2. Description of the Related Art

Screws are the commonest connecting members for mechanisms. When the screw is to be screwed on, a hand tool, such as a screw driver or a wrench, is positioned on the screw and then used to rotate the screw at the position with a connection requirement.

However, the user is sometimes unable to get the screw driver or wrench immediately when the user wants to rotate the screw. The user has to spend extra time and effort to find the screw driver or wrench before rotating the screw. On the other hand, the shape or size of the screw driver may be not correspondent with the positioning manner of the screw, that is not only possible to cause the screw rotated unfavorably, and even possible to damage the screw. Besides, as to the prior art as shown in FIGS. 55-56, although the screw 100 is provided at the top end thereof with a handling rotating portion 102 for the user's hand to hold the handling rotating portion 102 to rotate the screw 100, the screw 100 is relatively larger in the volume thereof and occupies relatively larger space, but limited in the rotation space thereof. Therefore, the screw 100 is unable to generate relatively larger fastening torque, thereby only applicable in the condition doesn't need relatively larger fastening force. The above description shows that the conventional screws need improvement.

SUMMARY OF THE INVENTION

Therefore, it is a primary objective of the present invention to provide a fastener which can be disposed at the to-be fastened position without use of an extra tool, wide in applicability and convenient in usage.

To attain the above objective, the fastener provided in the present invention includes a connecting member and a handling member. The connecting member has a first axis and an accommodating space extended along the first axis. The handling member has a second axis and is movably disposed in the accommodating space of the connecting member. The handling member is movable between a first position and a second position. When located at the first position, the handling member is disposed in the accommodating space in a way that the second axis is approximately coaxial with the first axis of the connecting member. When located at the second position, the handling member is positioned in a hollow part of a head portion of the connecting member in a way that an included angle is provided between the second axis and the first axis of the connecting member so that the handling member is able to be rotated by an external force to drive the connecting member to rotate at a to-be fastened position.

In the preferred embodiments of the present invention, the handling member has a limiting portion; the connecting member has a stopping portion located in the accommodating space; the limiting portion is larger in size than an opening on a cross section of the accommodating space at the stopping portion so that the handling member is prevented from being separated from the connecting member.

In the preferred embodiments of the present invention, the handling member has a movable limiting portion; after the handling member is pulled out from the connecting member, the limiting portion is located at the stopping portion and enables the handling member to be adjusted in a length thereof, for which the handling member is extended out from the outside of a driven end of the connecting member.

In the preferred embodiments of the present invention, the connecting member is provided at an end thereof with a fastening end and at another end thereof with a driven end; the driven end has a positioning part which is hollow-shaped; when the handling member is located at the second position, the handling member is embedded in the positioning part.

In the preferred embodiments of the present invention, a hole-closing component is provided in the accommodating space of the connecting member.

In the preferred embodiments of the present invention, a head portion of the handling member is capable of being plugged into, being stacked on, or capping a driven end of the connecting member.

In the preferred embodiments of the present invention, the handling member is equipped with a key; the handling member has to be handled by the key to be separated from the connecting member.

In the preferred embodiments of the present invention, the ratio of the total length of the handling member to the total length of the connecting member is ranged from 0.1 to 4.

In the preferred embodiments of the present invention, the ratio of the outer diameter of the connecting member to the outer diameter of the handling member is ranged from 1.1 to 5.

In the preferred embodiments of the present invention, the handling member has a head portion; the connecting member has a driven end; the driven end and the head portion are capable of being screwed together.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 18 and FIG. 19 are sectional views of the third preferred embodiment of the present invention, showing different positions of the handling member.

FIG. 20 is a schematic view of an application of the third preferred embodiment of the present invention.

FIG. 21 is an exploded perspective view of a fourth preferred embodiment of the present invention.

FIG. 22 is a front view of the fourth preferred embodiment of the present invention.

FIG. 28 is a front view of the sixth preferred embodiment of the present invention.

FIG. 29 is a sectional view taken along the line 29-29 in FIG. 28.

FIG. 30 is an exploded perspective view of a seventh preferred embodiment of the present invention.

DETAILED DESCRIPTION OF THE INVENTION

First of all, it is to be mentioned that the present invention is widely applicable in various fields of machinery and mechanism. Those skilled in this field should understand that the illustrative phraseology in the detailed description of the invention belongs to a generic description of unlimited applicatory fields. For example, the meaning of the word "movable (movably)" includes, but unlimited to, the component connection such as displacing, rotating, or sliding; the meaning of the word "adjacent" includes, but unlimited to, near, connected with, or adjoining; the meaning of the quantitative word "a (one)" for each element includes one and more than one or a plurality of elements.

Figure 1:
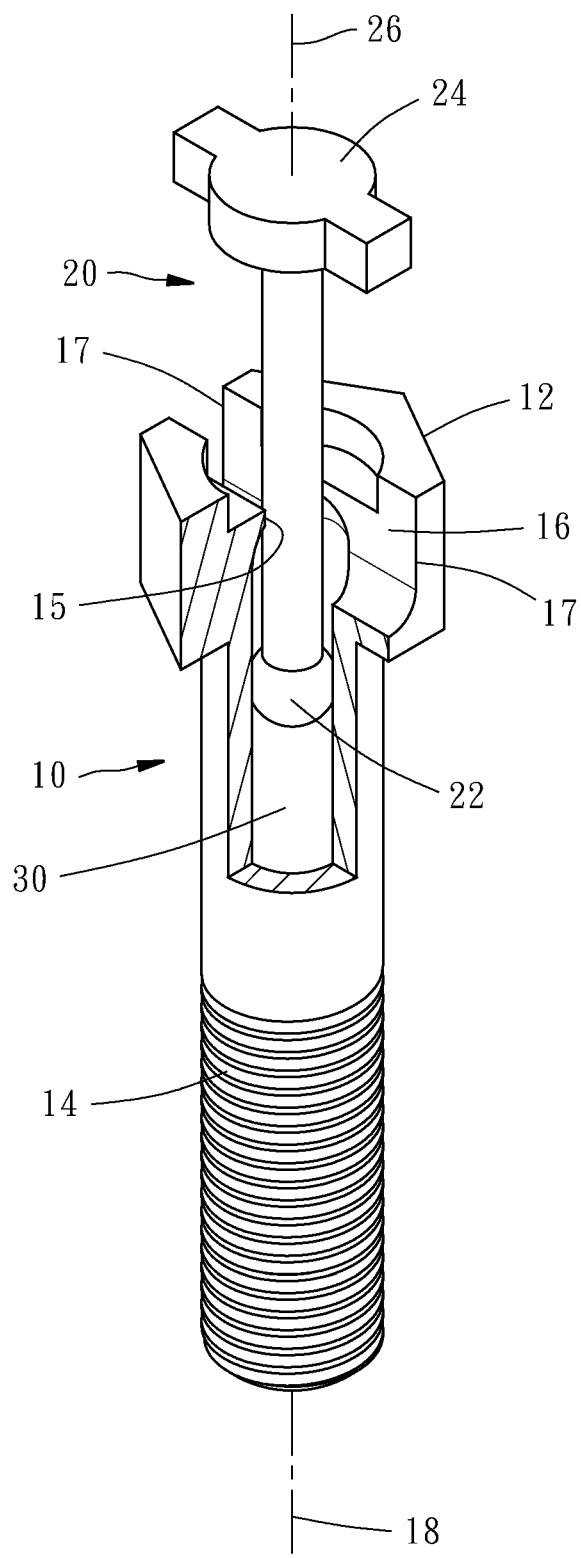
FIG. 1 is a partially-cut-off perspective view of a first preferred embodiment of the present invention, showing the condition that a handling member is pulled out from a connecting member.
Figure 2:
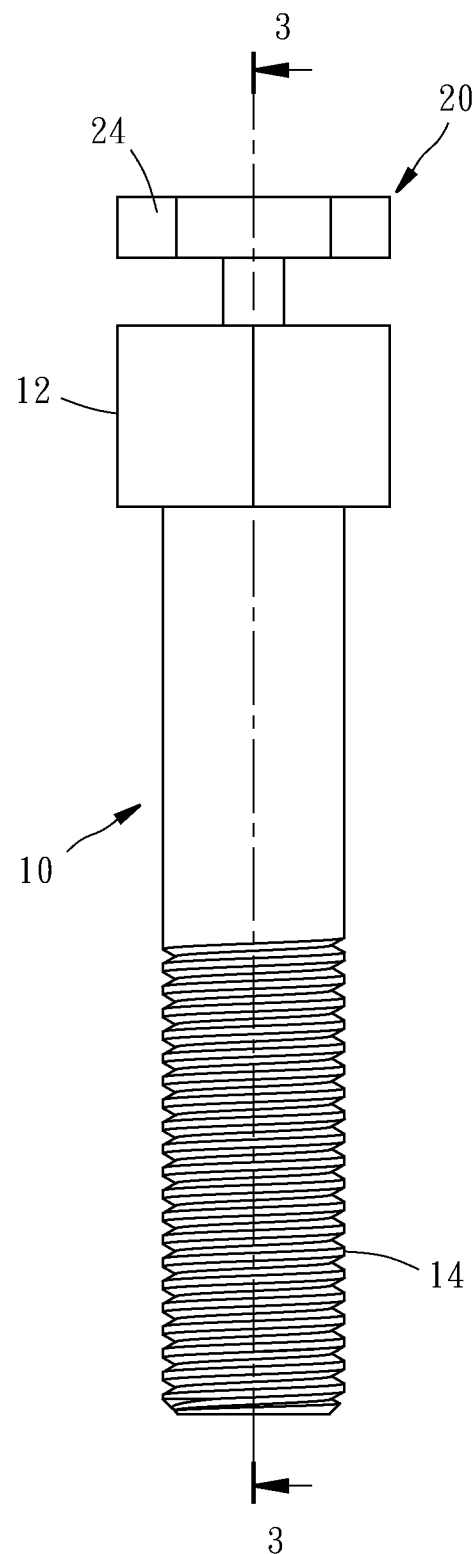
FIG. 2 is a front view of the first preferred embodiment of the present invention, showing the condition that the handling member is pulled out from the connecting member.
Figure 3:
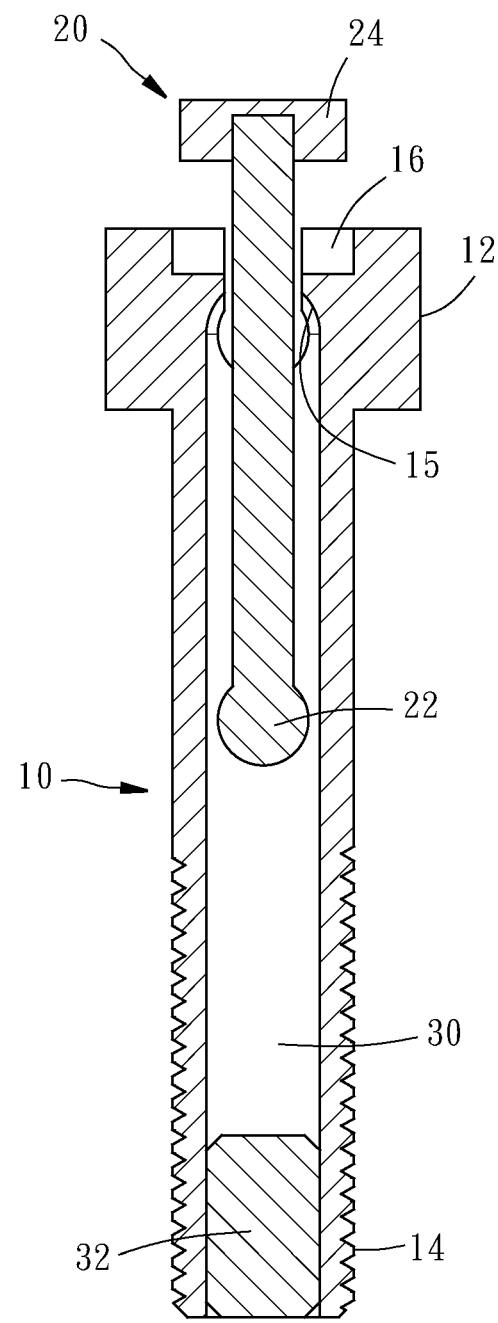
FIG. 3 is a sectional view taken along the line 3-3 in FIG. 2.

As shown in FIG. 1 to FIG. 3, a fastener provided in a first preferred embodiment of the present invention primarily includes a connecting member 10 and a handling member 20. In this preferred embodiment, the connecting member 10 and the handling member 20 each shaped as an integrally formed rod are taken as an example. The connecting member 10 has a driven end 12 and a fastening end 14. The connecting member 10 is defined with a first axis 18 along centers of the driven end 12 and the fastening end 14. The connecting member 10 is provided along the first axis 18 with an accommodating space 30 penetrating through the driven end 12. In the present invention, the appearance and configuration of the driven end 12 may be adjusted correspondingly to various applicatory fields or additional functions. In the first preferred embodiment, the cross section of the driven end 12 is approximately shaped as a hexagon, so that the connecting member 10 can be used as a bolt, having an additional function of being rotated by an extra tool.

The driven end 12 of the connecting member 10 has a positioning part 16. The configuration and shape of the positioning part 16 may be adjusted correspondingly to the various applicatory fields or additional functions. In the first preferred embodiment, the positioning part 16 is a groove concaved from the top surface of the driven end 12. The positioning part 16 transversely penetrates through the outer wall of the driven end 12 to provide at least one breaches 17 on the outer wall of the driven end 12. In the first preferred embodiment, there are two breaches 17 oriented toward the directions different from the extending direction of the first axis 18. The accommodating space 30 communicates with the positioning part 16 at the driven end 12. The connecting member 10 has a stopping portion 15 located in the accommodating space 30 at the position thereof adjacent to the positioning part 16. In this preferred embodiment, the stopping portion 15 is protruded on the inner wall of the accommodating space 30, so that the opening on the cross section of the accommodating space 30 at the position adjacent to the positioning part 16 is smaller in size than the openings on the cross sections of the accommodating space 30 at the other positions. Besides, the connecting member 10 may be additionally provided with another stopping portion located in the accommodating space 30 and adjacent to the fastening end 14.

Figure 4:
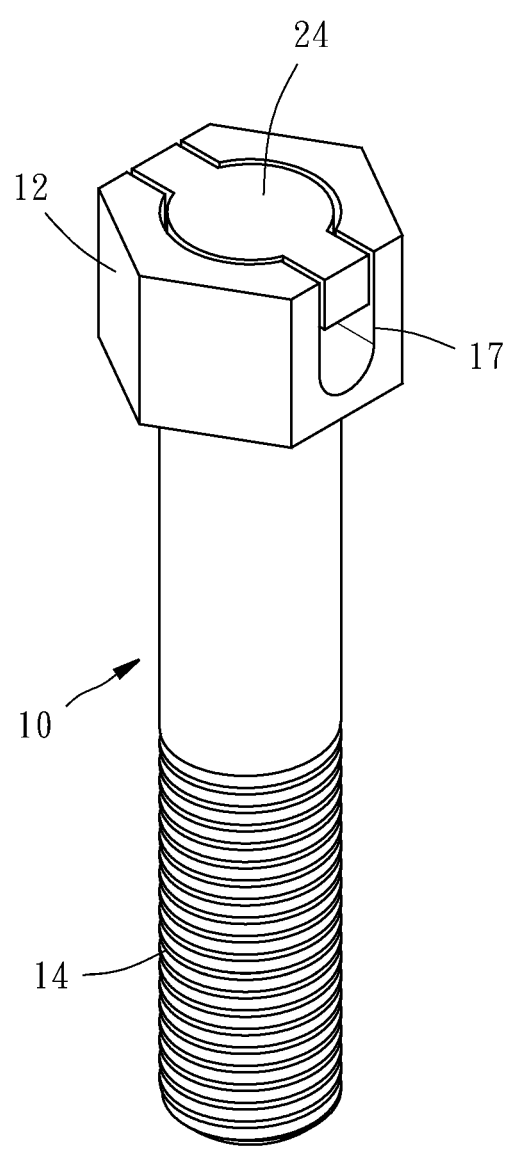
FIG. 4 is an assembled perspective view of the first preferred embodiment of the present invention, wherein the handling member is located at a first position.
Figure 5:
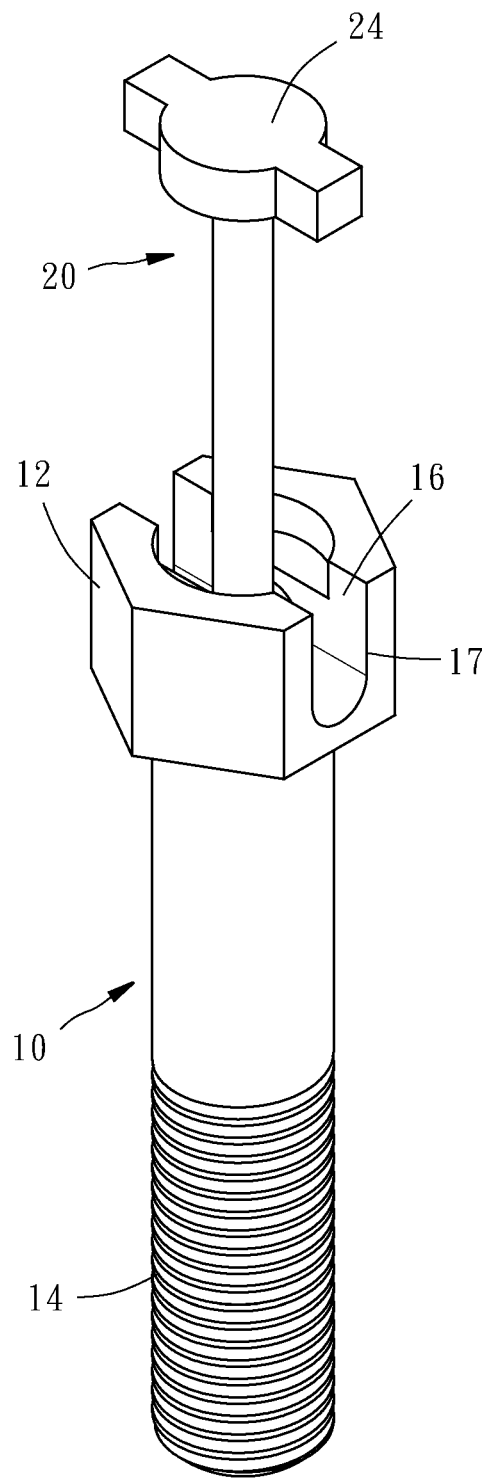
FIG. 5 is an assembled perspective view of the first preferred embodiment of the present invention, wherein the handling member is pulled out from the connecting member.
Figure 6:
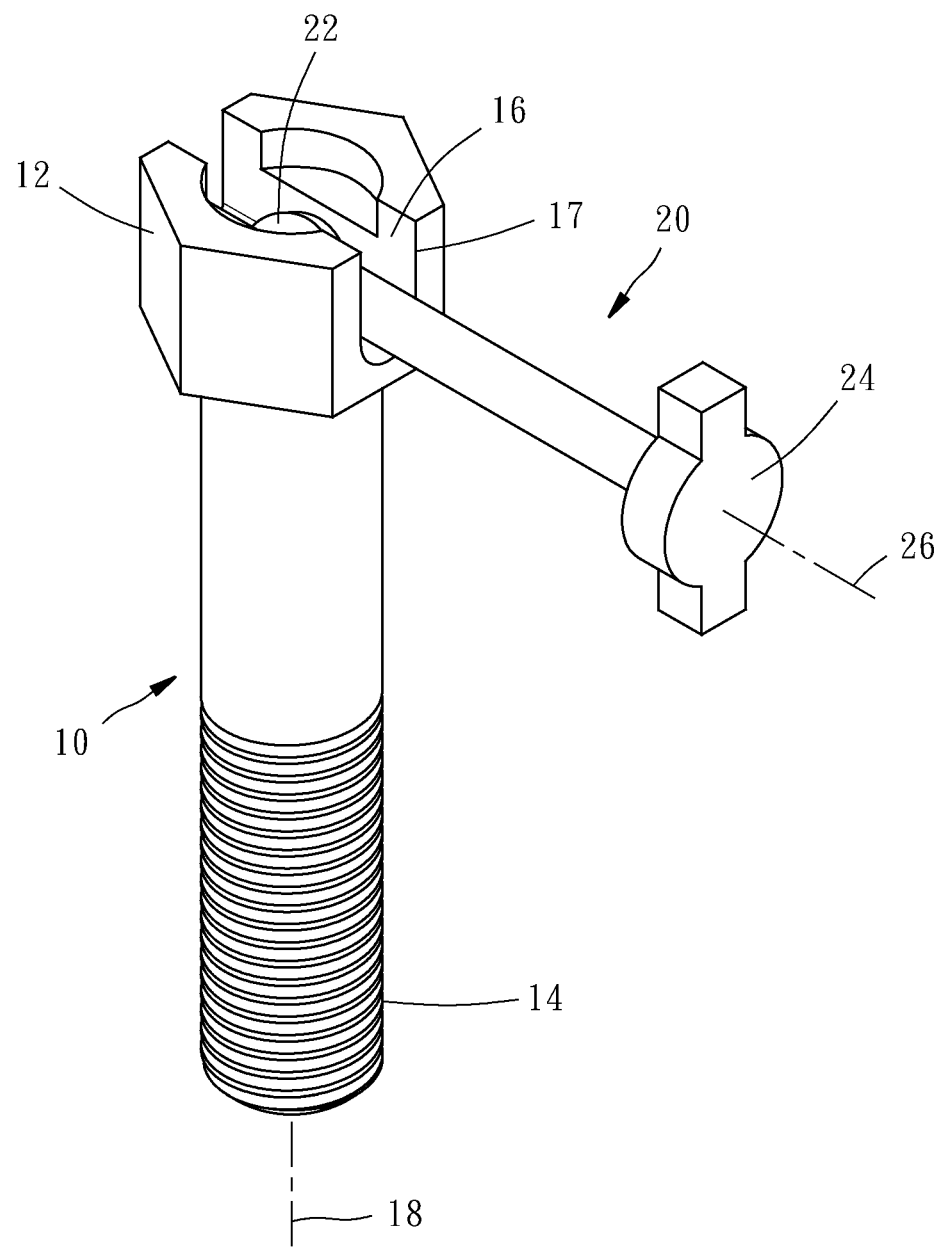
FIG. 6 is an assembled perspective view of the first preferred embodiment of the present invention, wherein the handling member is located at a second position.
Figure 7:
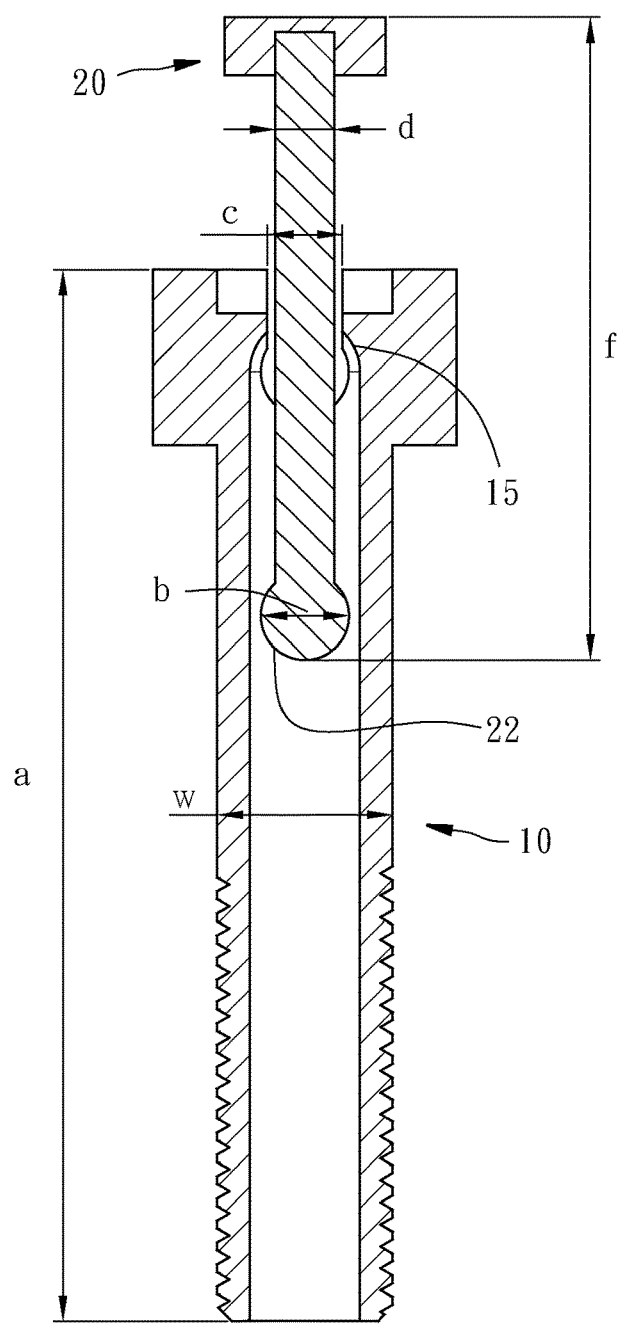
FIG. 7 is a dimensional schematic view of the first preferred embodiment of the present invention.

The handling member 20 is provided at an end thereof with a limiting portion 22 and at the other end thereof with a head portion 24. The handling member 20 is defined with a second axis 26 along centers of the limiting portion 22 and the head portion 24. The configuration and shape of the head portion 24 disclosed in the first preferred embodiment is matched with the positioning part 16 of the driven end 12. The limiting portion 22 is ball-shaped. The configuration and shape of the limiting portion 22 and the head portion 24 may be adjusted correspondingly to the various applicatory fields or additional functions. The handling member 20 is inserted in the accommodating space 30 of the connecting member 10. The limiting portion 22 is located in the accommodating space 30. As shown in FIG. 7, the width b of the limiting portion 22 is larger than the size c of the opening on the cross section at the stopping portion 15. Because of having the limiting portion 22, the handling member 20 is prevented from being separated from the connecting member 10. As shown in FIG. 4 to FIG. 6, the handling member 20 can be inserted into or pulled out from the connecting member 10 between a first position as shown in FIG. 4 and a second position as shown in FIG. 6. When located at the first position, the handling member 20 is disposed in the accommodating space 30 in a way that the second axis 26 is approximately coaxial with the first axis 18 of the connecting member 10, the head portion 24 is plugged in and even with the driven end 12, and the handling member 20 is received in the connecting member 10. When the handling member 20 is located at the second position, the handling member 20 is positioned on the connecting member 10 in a way that an included angle, which is ranged from 30 to 90 degrees in this preferred embodiment, is provided between the second axis 26 and the first axis 18 of the connecting member 10, the handling member 20 is embedded and positioned in the positioning part 16 of the driven end 12, so that the handling member 20 can be rotated by an external force to drive the connecting member 10 in a way that the fastening end 14 is rotated into or out from a to-be fastened position.

Figure 8:
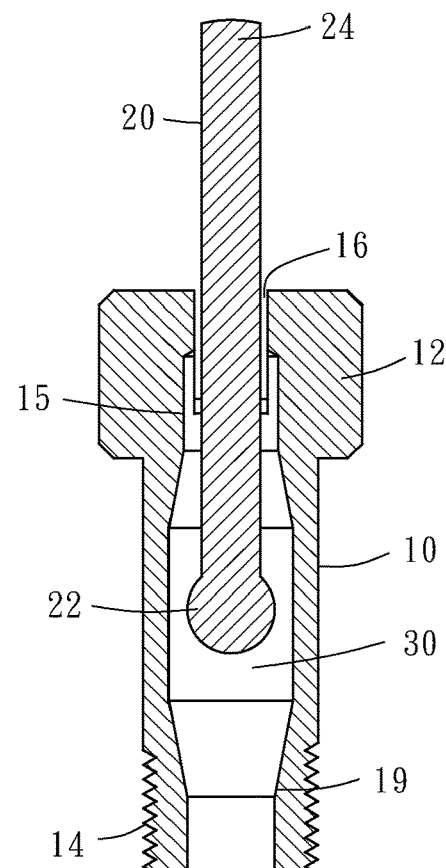
FIG. 8 is similar to FIG. 3, primarily showing another practical configuration of the connecting member.
Figure 9:
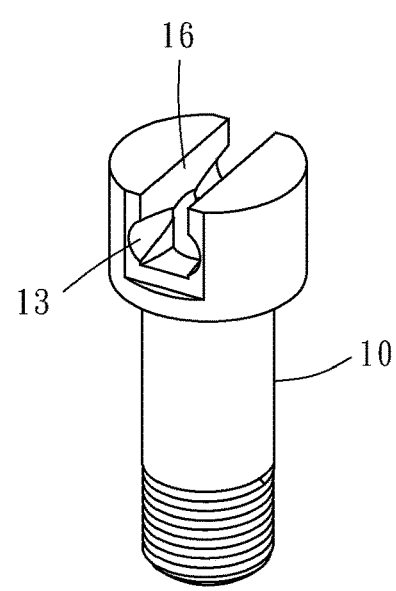
FIG. 9 is a perspective view showing still another practical configuration of the connecting member provided in the present invention.

For preventing the handling member 20 from being separated from the connecting member 10, in the manufacturing process, the connecting member 10 can be applied with an external pressure to be formed with the stopping portion 15 after the handling member 20 is inserted into the accommodating space 30 of the connecting member 10. At the same time, as shown in FIG. 3, a hole-closing component 32 may be provided in the accommodating space 30 of the connecting member 10 and located close to the fastening end 14, for preventing external things from entering the accommodating space 30. The hole-closing component 32 may be an additional member as shown in FIG. 3, or a constrictive part of the connecting member 10 formed after the handling member 20 is inserted into the accommodating space 30. As shown in FIG. 8, another practical configuration of the connecting member 10 is that the connecting member 10 has a throat 19 located inside the accommodating space 30 and adjacent to the fastening end 14, so that the accommodating space 30 is relatively smaller in the size of the opening thereof located at the fastening end 14, that increases the tensile strength of the connecting member 10. Besides, the cross-sectional shape of the throat 19 may be approximately a hexagon for an extra tool to rotate the connecting member, or the throat 19 may be provided with inner thread for being combined with another component. As shown in FIG. 9, still another practical configuration of the connecting member 10 is that the positioning part 16 thereof is additionally provided with an assembly hole 13 for improving the assembling stability. In addition, there may be a magnetic member disposed in the accommodating space 30 of the connecting member 10 for attracting the handling member made of metal.

The dimensional relationship between each portion of the connecting member 10 and the handling member 20 in the first preferred embodiment is shown in FIG. 7. For example, the ratio f/a of the total length f of the handling member 20 to the total length a of the connecting member 10 is preferably ranged from 0.1 to 4, and the ratio w/d of the outer diameter w of the connecting member 10 to the outer diameter d of the handling member 20 is preferably ranged from 1.1 to 5, so that the connecting member 10 can be rotated by the handling member 20 relatively more effectively and the connecting member 10 is relatively more firm in structure-fastening work.

Through the aforesaid technical features, the handling member 20 is disposed in the connecting member 10 in a way that the handling member 20 is movably pulled out or inserted into the accommodating space 30. As long as the handling member 20 is directly or indirectly pulled out to the second position and positioned on the connecting member 10, the connecting member 10 can be rotated by the handling member 20 until the connecting member 10 is fixed and accomplishes the fastening function through the fastening end 14. After that, the handling member 20 only needs to be moved back to the first position, so that the handling member 20 is completely received in the accommodating space 30. The connecting member 10 can be rotated without use of an extra screw driver or wrench, so the present invention is convenient in usage, and widely applicable in all applicatory fields with structure-fastening requirement, such as land, sea and air vehicles, construction engineering, packaging, machinery, furniture, fire protection, medical aids, or polar applications. Besides, the handling member 20 can be integrated inside the connecting member 10, so the structure is simple, compact, not relatively larger in volume and weight, and maintained with sufficient structural strength and fastening force at the same time. If a washer, such as an annular plain washer, a spring washer or a waveform washer, is additionally disposed between the fastening end 14 of the connecting member 10 and the fastened structure, it can increase the connection strength between the connecting member and the fastened structure, and also decrease the wear and noise resulted from the friction between the connecting member and the fastened structure.

The producing and manufacturing process of the present invention is diversified and flexible for conforming with various applicatory requirements. For example, the material of the connecting member 10 and the handling member 20 may be one or more than one of ferroalloy, non-ferrous alloy, ceramic material, polymer material, composite material, or elastic material. The head portion 24 and the limiting portion 22 of the handling member 20 may be formed integrally by lathe machining, forging, metal injection, plastic injection, or compression molding. Alternatively, the head portion 24 and the limiting portion 22 may be two detachable elements to compose the handling member 20 by a connecting manner such as thread fastening, welding, magnet, riveting, gluing, insertion, or ultrasonic welding. For example, as shown in FIG. 3, the limiting portion 22 or the hole-closing component 32 for the sealing demand may be made of elastic material for being installed into the accommodating space 30 conveniently.

Figure 10:
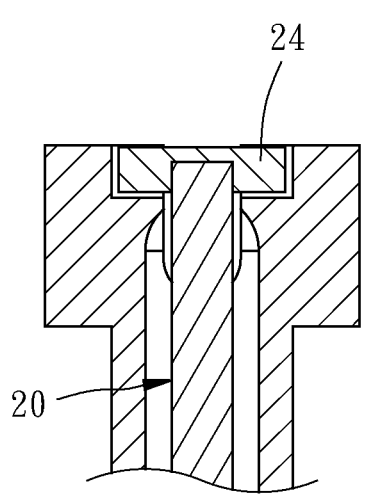
FIGS. 10-13 are sectional views of the first preferred embodiment of the present invention, primarily showing different practical configurations of a driven end and a head portion.
Figure 11:
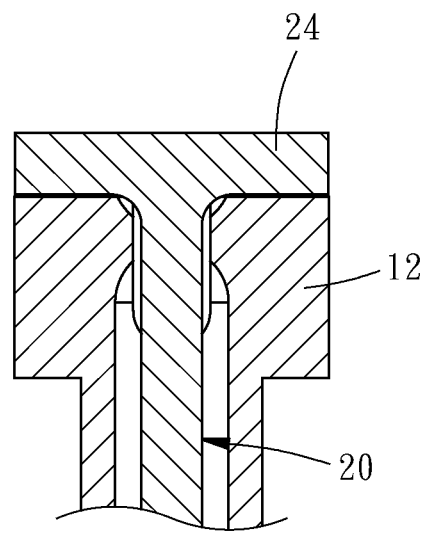
Figure 12:
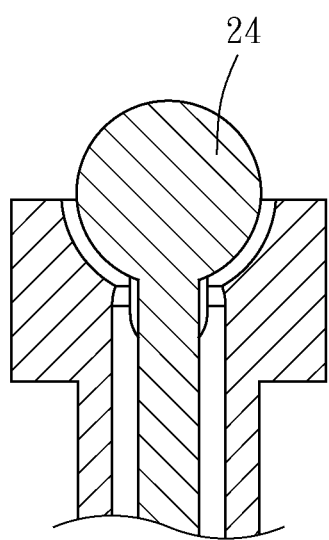
Figure 13:
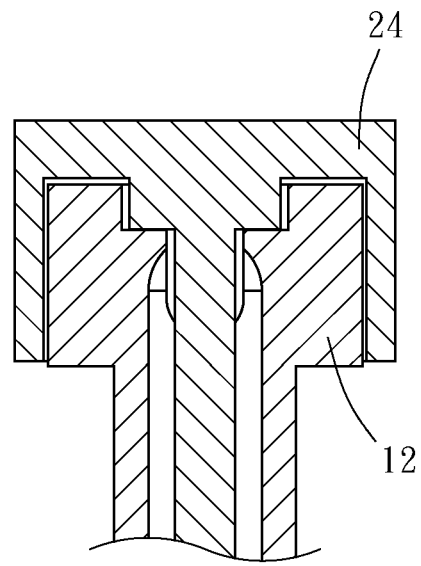

As shown in FIG. 10, the head portion 24 of the handling member 20 may be directly connected to or screwed onto the top end of a body portion of the handling member. As shown in FIG. 11, the head portion 24 of the handling member 20 may be formed integrally and stacked on the driven end 12. As shown in FIG. 12, the head portion 24 may be ball-shaped, but unlimited to ball-shaped or other shapes, and disposed in the driven end 12. Alternatively, as shown in FIG. 13, the head portion 24 may cap the driven end 12.

Figure 14:
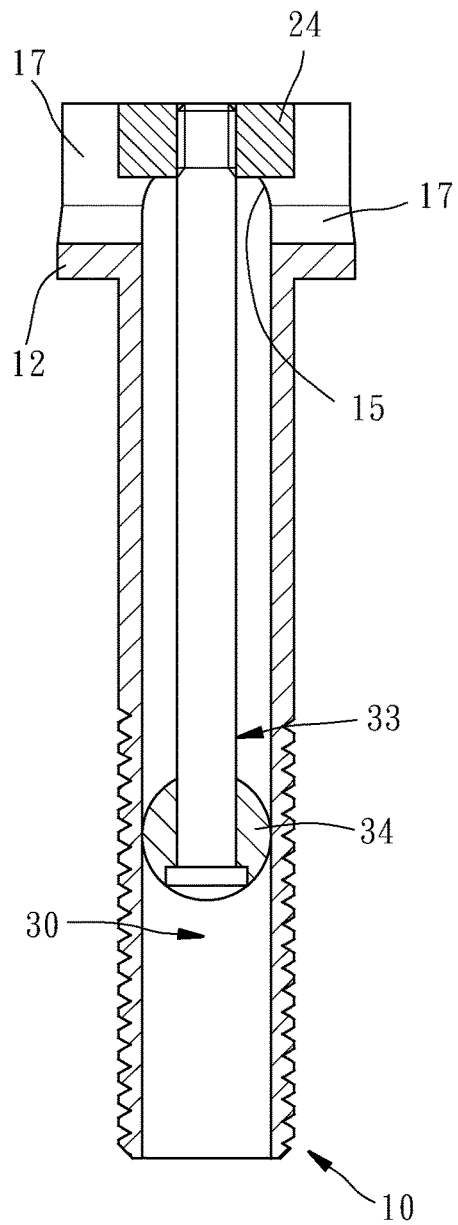
FIG. 14 is a sectional view of a second preferred embodiment of the present invention.
Figure 15:
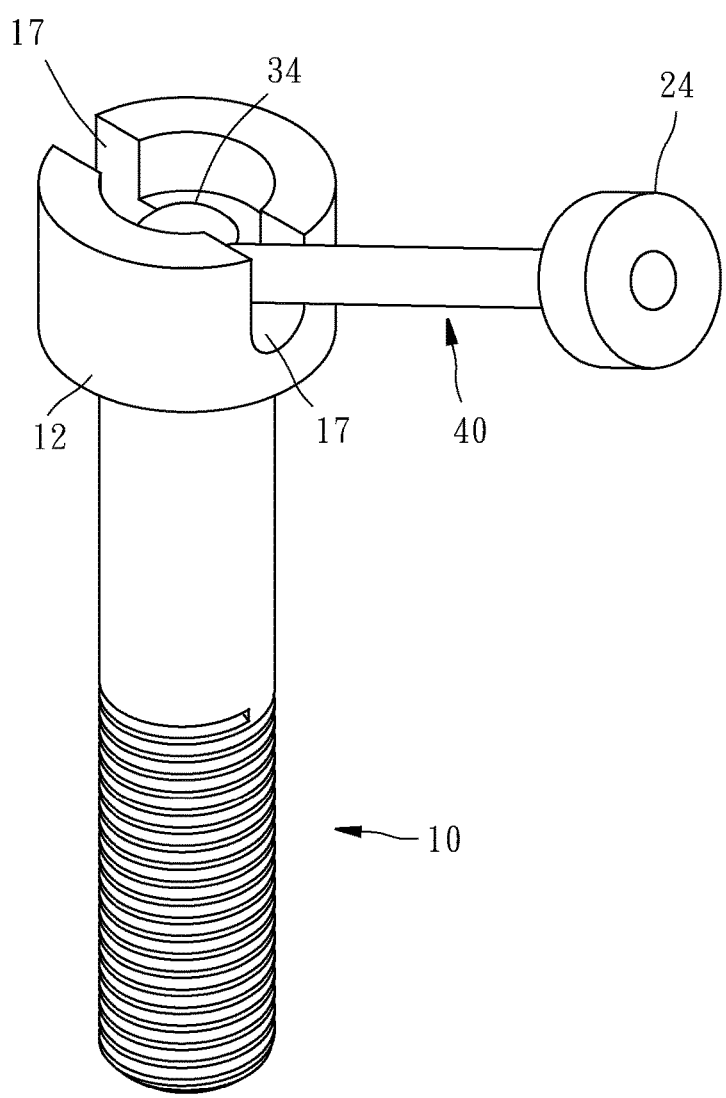
FIG. 15 is an assembled perspective view of the second preferred embodiment of the present invention.
Figure 16:
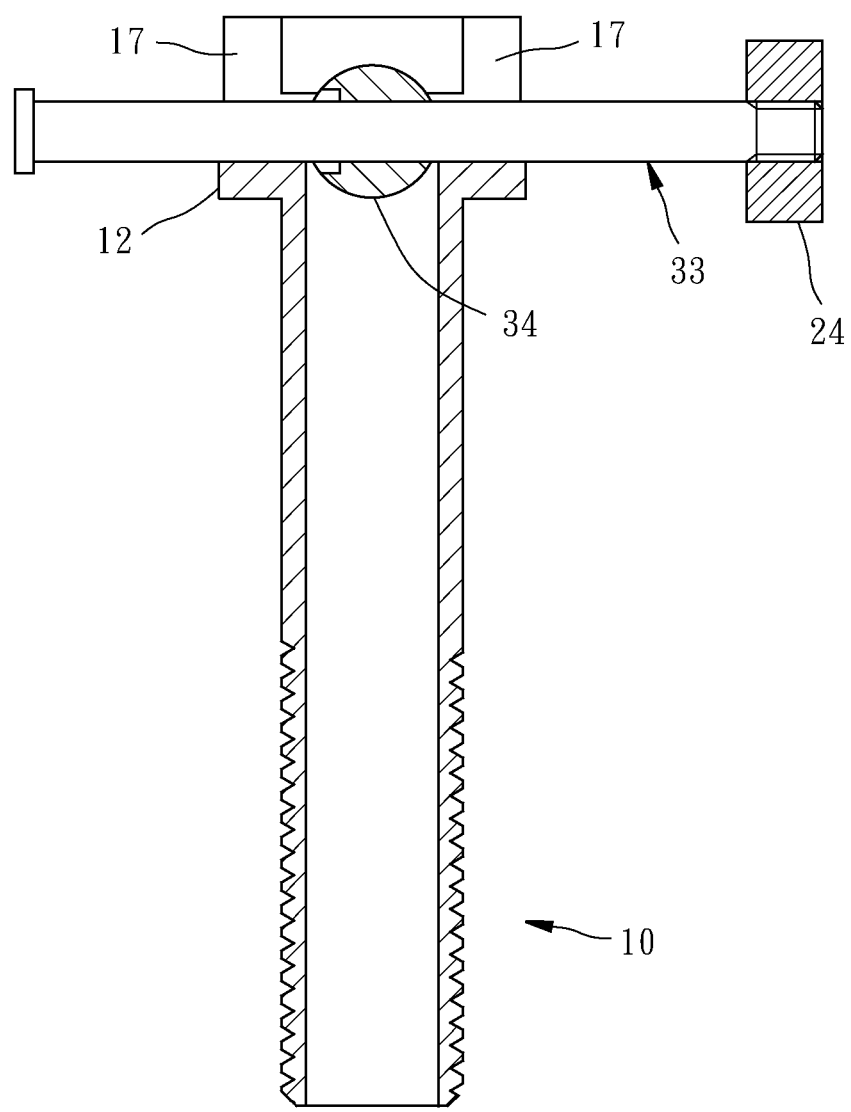
FIG. 16 is another sectional view of the second preferred embodiment of the present invention.
Figure 17:
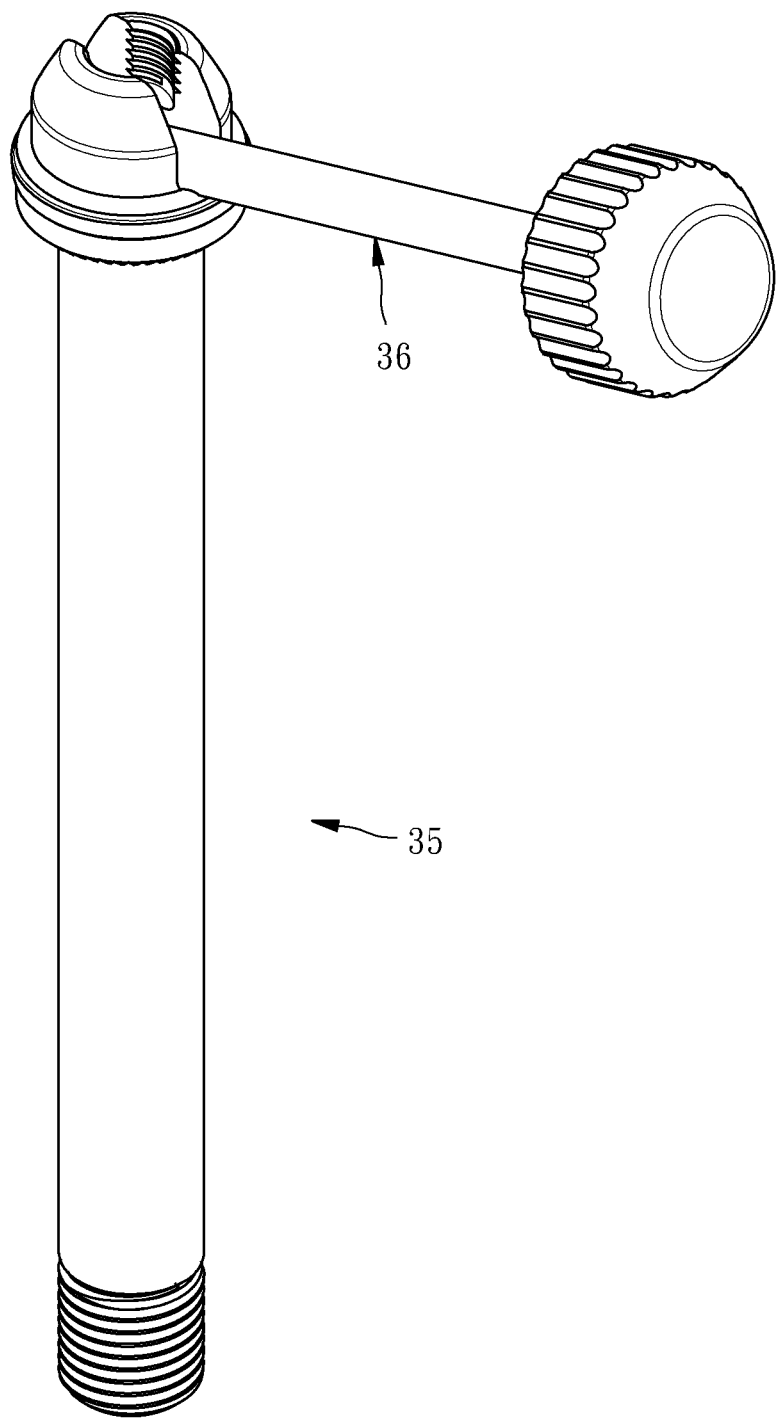
FIG. 17 is an assembled perspective view of a third preferred embodiment of the present invention.
Figure 18:
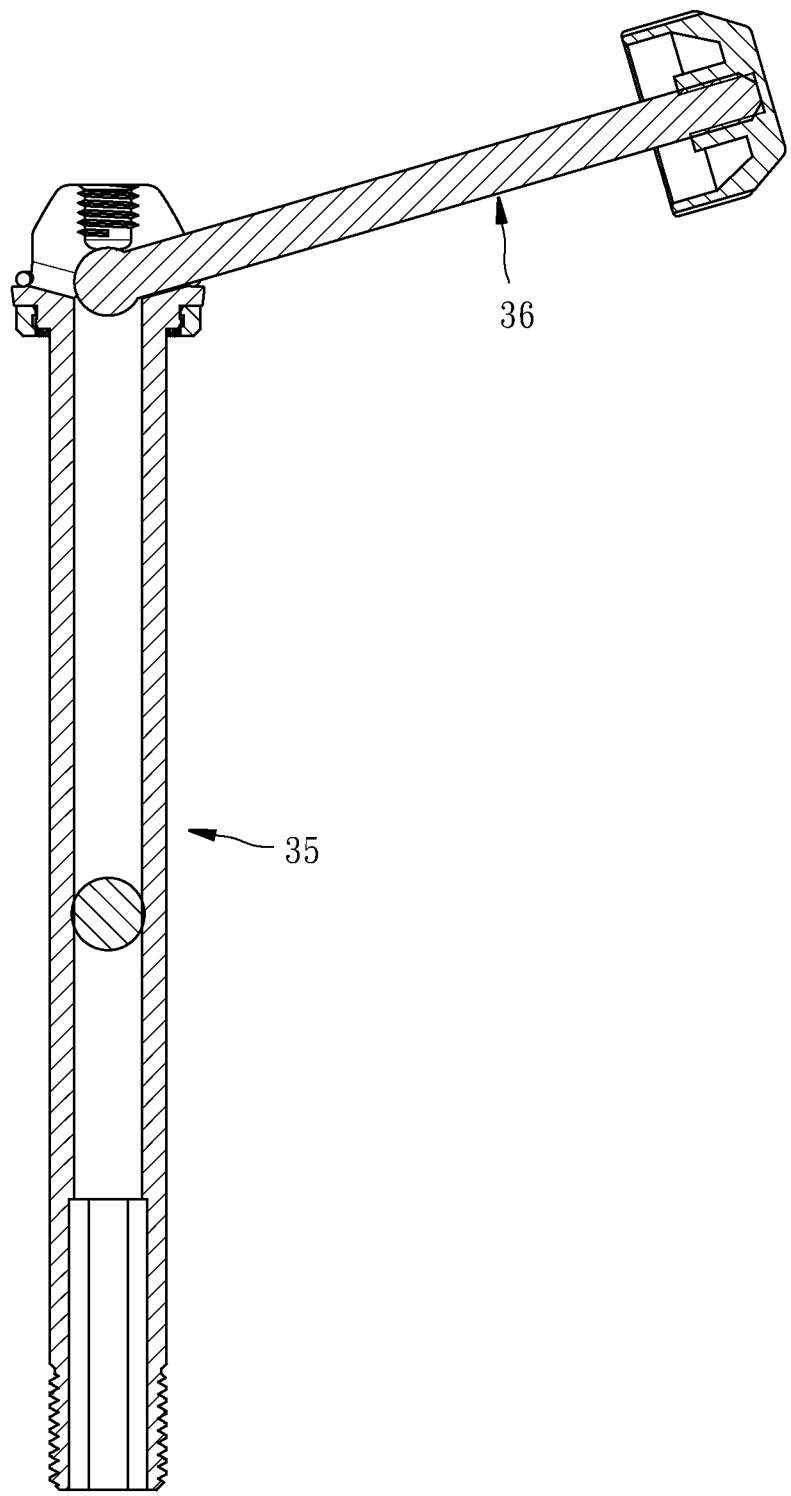

As shown in FIG. 14 to FIG. 16, for avoiding the condition that there is insufficient space for the rotation of the handling member 33 when the handling member 33 is located at the second position, the limiting portion 34 in the second preferred embodiment of the present invention is designed as a movable element. For example, the body portion of the handling member 33 may be inserted through the limiting portion 34. The driven end 12 of the connecting member 10 has two breaches 17. After the handling member 33 is pulled out from the connecting member 10, the limiting portion 34 is located at the stopping portion 15, and then the handling member 33 is rotated by means of the limiting portion 34 and inserted through the two breaches 17, so that the length for which the handling member 33 is extended out from the outside of the driven end 12 can be adjusted and modified to attain the purpose that the handling member 20 can rotate the connecting member 10 in small space.

An extended application of the present invention is as shown in FIG. 17 to FIG. 20, wherein the application of the third preferred embodiment of the present invention is the fastening of a wheel shaft of a bicycle. The connecting member 35 is the wheel shaft. The handling member 36 is a handle for rotating the wheel shaft. The driven end 37 of the connecting member 35 and the head portion 38 of the handling member 36 can be screwed together, attaining the effect of convenient installation and uninstallation of the bicycle wheel and hidden structure.

Figure 23:
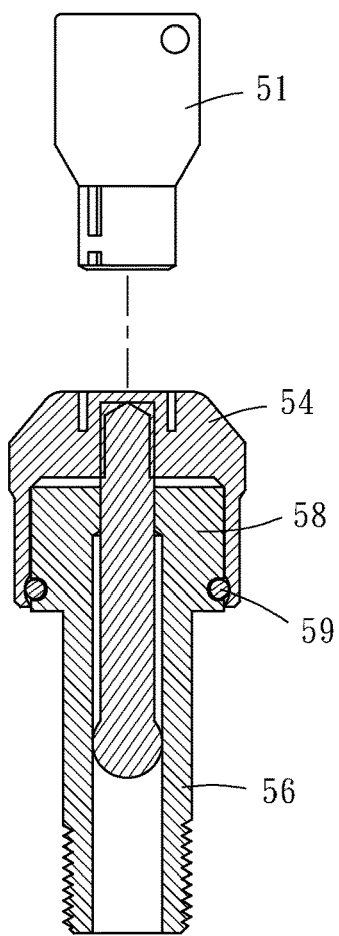
FIG. 23 is a sectional view taken along the line 23-23 in FIG. 22.

The present invention may be added with a burglarproof feature. As shown in FIGS. 21-23, a fourth preferred embodiment of the present invention provides a fastener, the primary technical components of which are approximately the same with that in the aforesaid preferred embodiments. This embodiment is characterized in that the head portion 54 of the handling member 50 is a cap optionally connected with the driven end 58 of the connecting member 56, and an auxiliary fastening device 59 is disposed between the head portion 54 and the driven end 58. In this preferred embodiment, the auxiliary fastening device 59 may be an O-ring or a C-shaped buckle, for improving the connection strength between the handling member 50 and the connecting member 56, preventing the handling member 50 from being pulled out from the connecting member 56 arbitrarily. As shown in FIG. 23, there may be a key 51 added to the handling member 50 in a way that the handling member 50 has to be handled by the key 51 to be separated from the connecting member 10.

Figure 24:
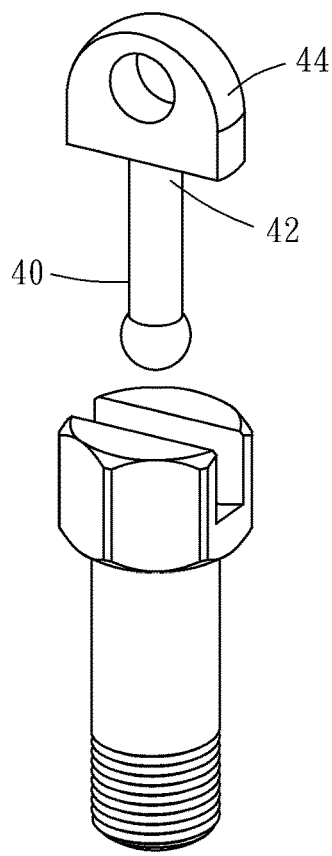
FIG. 24 is an exploded perspective view of a fifth preferred embodiment of the present invention.
Figure 25:
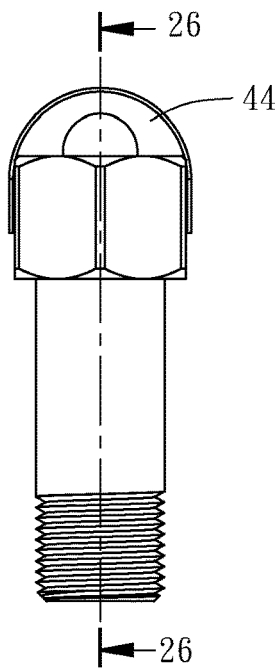
FIG. 25 is a front view of the fifth preferred embodiment of the present invention.
Figure 26:
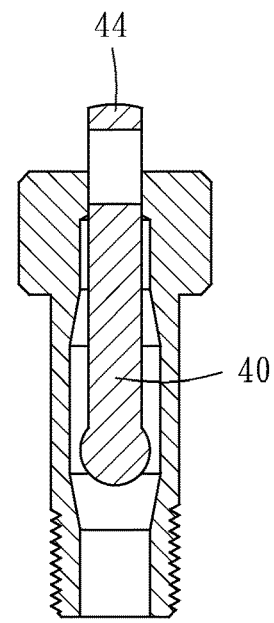
FIG. 26 is a sectional view taken along the line 26-26 in FIG. 25.

As shown in FIGS. 24-26, the fastener provided by the fifth preferred embodiment of the present invention is characterized in that the head portion 42 of the handling member 40 has a handling part 44 for being hold conveniently.

Figure 27:
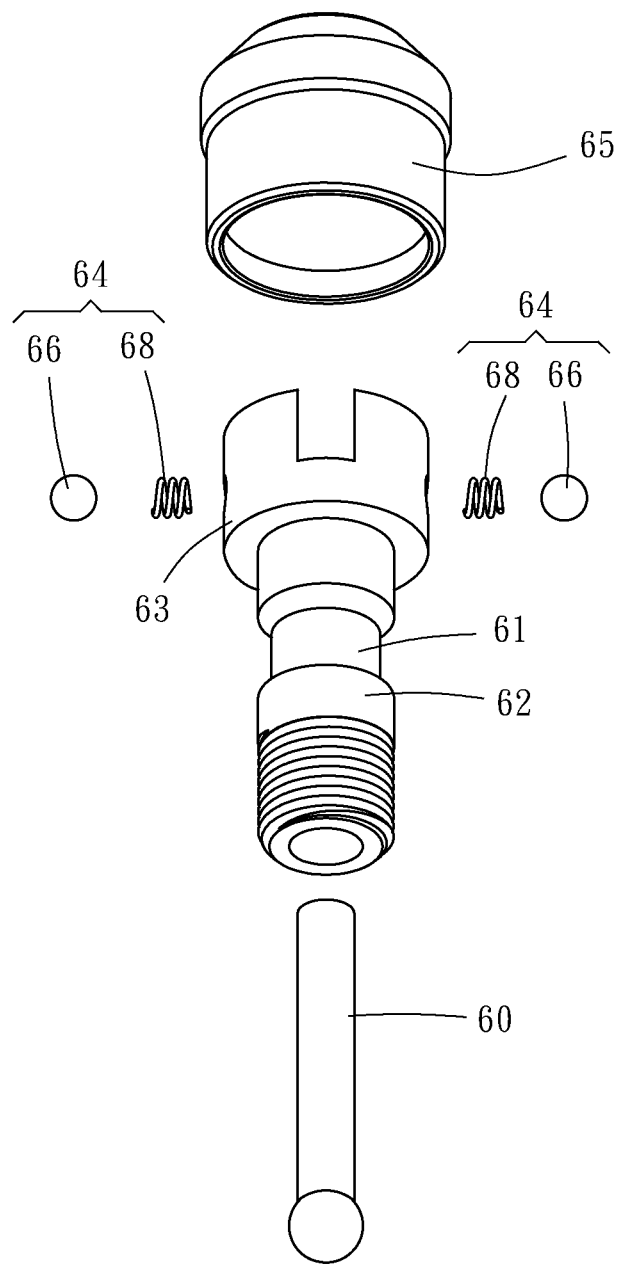
FIG. 27 is an exploded perspective view of a sixth preferred embodiment of the present invention.

As shown in FIGS. 27-29, the fastener provided by the sixth preferred embodiment of the present invention is characterized in that at least one positioning unit 64 is additionally disposed between the handling member 60 and the connecting member 62. For example, the positioning unit 64 includes a positioning ball 66 and an elastic member 68. The positioning unit 64 is disposed on the outer peripheral wall of the driven end 63 of the connecting member 62. When the head portion 65 of the handling member 60 is connected with the driven end 63 of the connecting member 62, the positioning unit 64 is embedded in the positioning part 67 located on the inner peripheral wall of the head portion 65 to improve the connection strength therebetween. Besides, the connecting member 62 may be provided at the rod body thereof with a relatively smaller radius portion 61 for decreasing the total weight.

Figure 31:
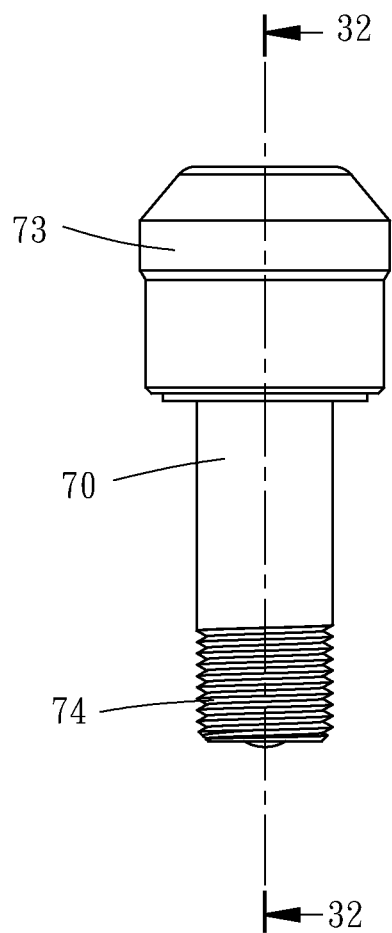
FIG. 31 is a front view of the seventh preferred embodiment of the present invention.
Figure 32:
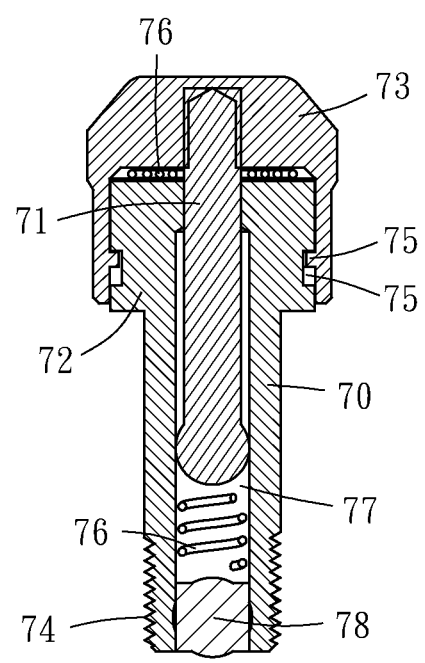
FIG. 32 is a sectional view taken along the line 32-32 in FIG. 31.
Figure 33:
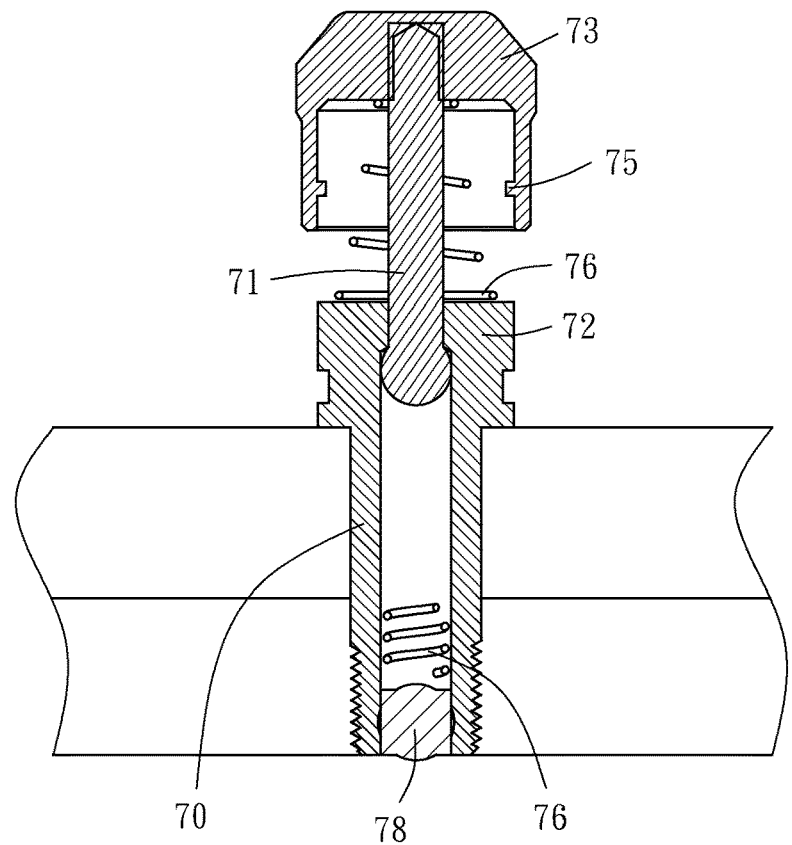
FIGS. 33-34 are schematic views showing the usage of the seventh preferred embodiment of the present invention.
Figure 34:
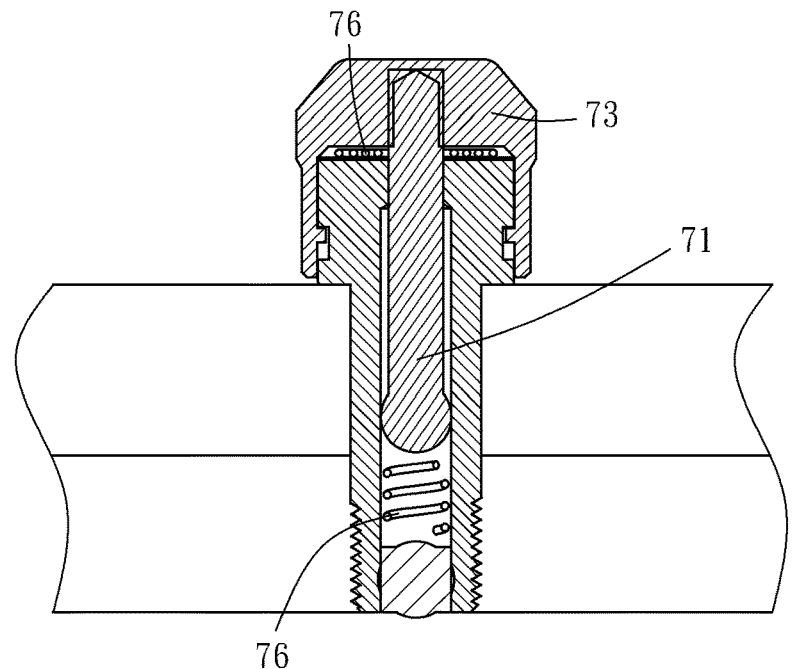

As shown in FIGS. 30-32, the fastener provided by the seventh preferred embodiment of the present invention is characterized in that the driven end 72 of the connecting member 70 and the head portion 73 of the handling member 71 are connected with each other by embedding portions 75 having concave and convex shapes corresponding to each other. For example, in this preferred embodiment, the embedding portion 75 provided on the driven end 72 is a recess, and the embedding portion 75 provided on the head portion 73 is a protrusion formed on the inner wall of the head portion. As long as the angle of the head portion 73 relative to the driven end 72 is adjusted rotationally, two embedding portions 75 can be separated from or connected with each other, thereby making the handling member 71 movable relative to or fixed to the connecting member 70. There may be an elastic member 76 disposed between the inside of the head portion 73 and the top of the driven end 72. For example, the elastic member 76 in this preferred embodiment is a spring. As shown in FIGS. 33-34, when the head portion 73 is to be connected with the driven end 72, the user only needs to press the head portion 73 to overcome the elastic force of the elastic member 76 before connecting the head portion 73 and the driven end 72 by the embedding portions 75. When the head portion 73 is separated from the driven end 72, the elastic force of the elastic member 76 directly pushes the handling member 71 to move toward the direction away from the connecting member 70. Such fastener is relatively more convenient in operation and usage. Alternatively, there may be another elastic member 76 and a hole-closing component 78 disposed in the accommodating space 77 of the connecting member 70 and located adjacent to the fastening end 74, and the elastic member 76 is located between the terminal end of the handling member 71 and the hole-closing component 78. When the handling member 71 is coaxially disposed in the connecting member 70, the elastic member 76 can provide elastic force to move the handling member 71 out from the connecting member 70. Such fastener is adapted for the condition that the operation space is relatively smaller or the handling member 71 is relatively harder to be hold. The hole-closing component 78 can prevent dirt in the external environment from entering the inside of the connecting member 70, preventing the problem of disability of normal operation resulted from getting stuck.

Figure 35:
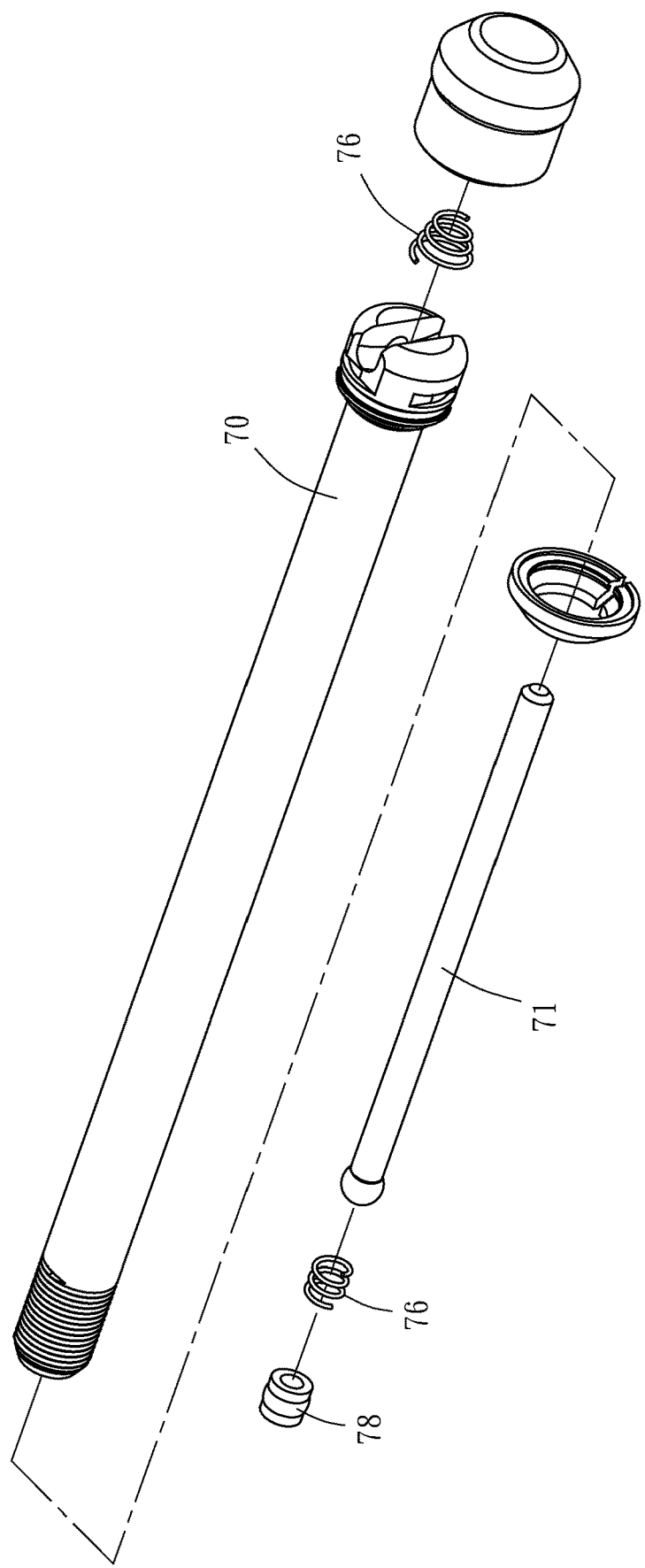
FIG. 35 is a schematic view showing an application of the seventh preferred embodiment of the present invention.

As shown in FIG. 35, the connecting member 70 is inserted through the bicycle frame and can be connected with or separated from the central hole of the bicycle wheel, which is conveniently operated by the user because of one or two elastic members 76 disposed between the handling member 71 and the connecting member 70. The hole-closing component 78 of the connecting member 70 can further prevent the sand and stones on the road from entering the connecting member 70.

Figure 36:
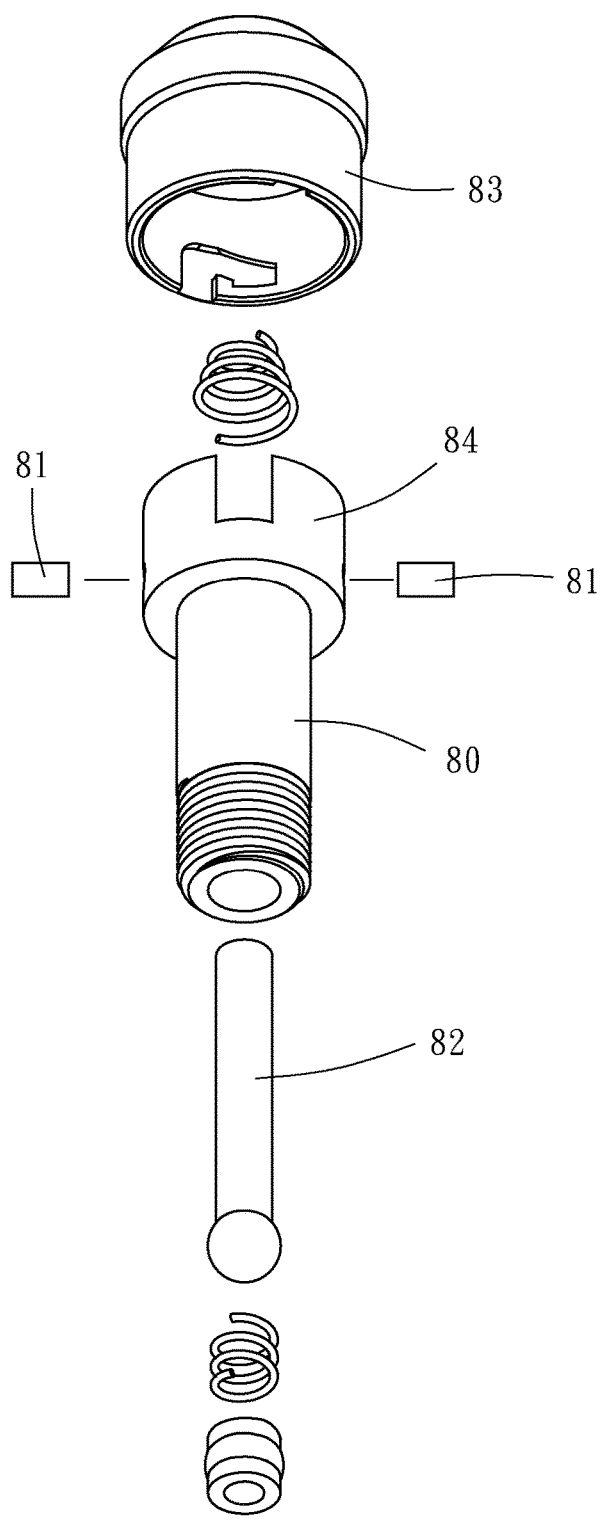
FIG. 36 is an exploded perspective view of a eighth preferred embodiment of the present invention.
Figure 37:
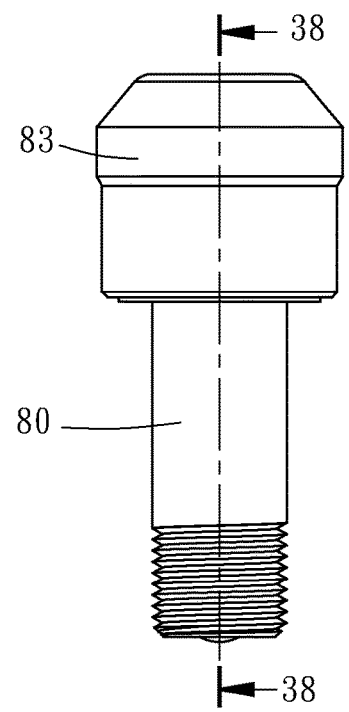
FIG. 37 is a front view of the eighth preferred embodiment of the present invention.
Figure 38:
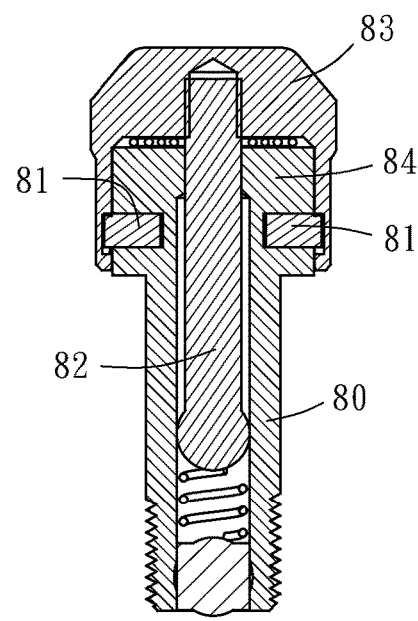
FIG. 38 is a sectional view taken along the line 38-38 in FIG. 37.

As shown in FIGS. 36-38, an eighth preferred embodiment of the present invention provides a fastener, the primary technical components of which are approximately the same with that in the seventh preferred embodiment. This embodiment is characterized in that a pin is instanced as the embedding portion 81 of the connecting member 80, and the two embedding portions 81 can be separated from or connected with the head portion 83 as long as the angle of the head portion 83 of the handling member 82 relative to the driven end 84 is adjusted rotationally.

Figure 39:
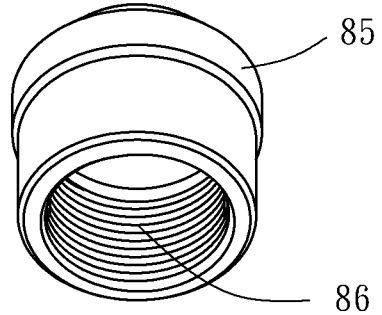
FIG. 39 is an exploded perspective view of a ninth preferred embodiment of the present invention.
Figure 39:
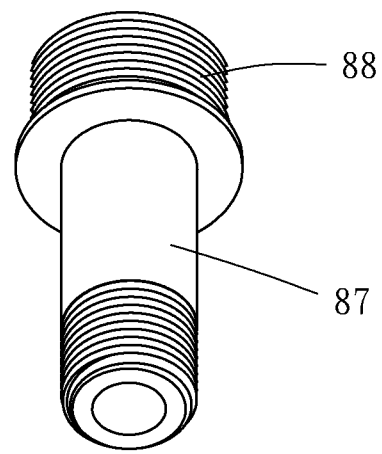
Figure 39:
Figure 40:
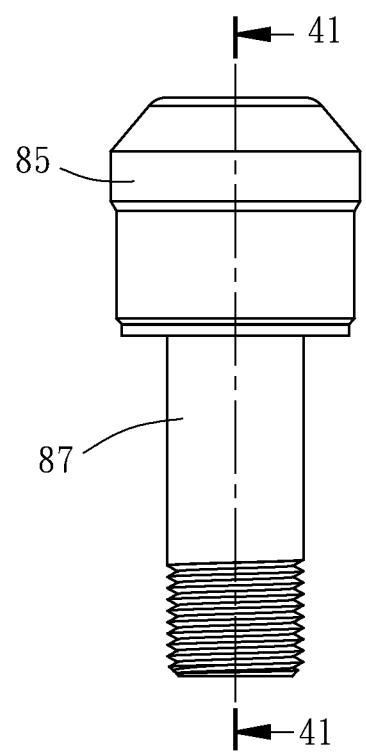
FIG. 40 is a front view of the ninth preferred embodiment of the present invention.
Figure 41:
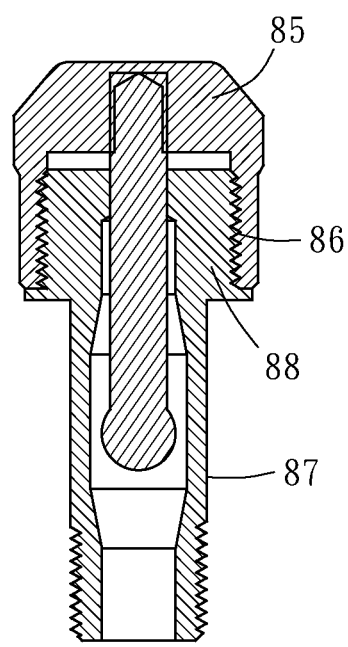
FIG. 41 is a sectional view taken along the line 41-41 in FIG. 40.

As shown in FIGS. 39-41, the fastener provided by the ninth preferred embodiment of the present invention is characterized in that the head portion 85 has an inner thread 86 for directly connected with the driven end 88 of the connecting member 87.

Figure 42:
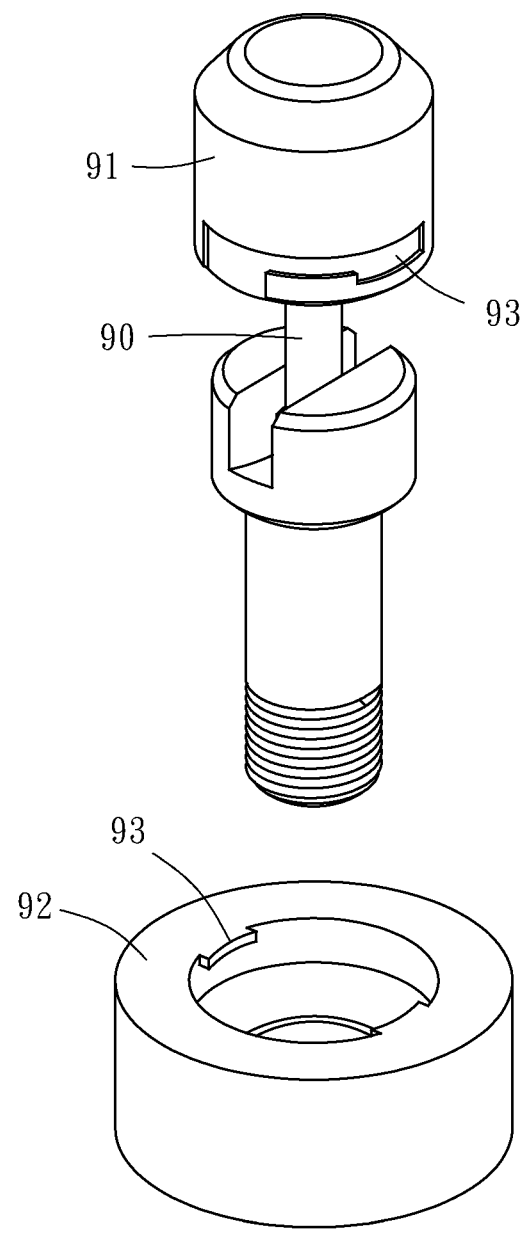
FIG. 42 is an exploded perspective view of a tenth preferred embodiment of the present invention.
Figure 43:
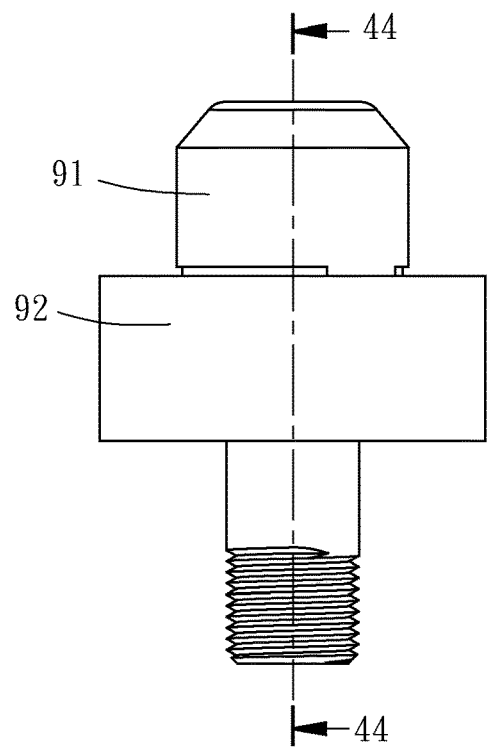
FIG. 43 is a front view of the tenth preferred embodiment of the present invention.
Figure 44:
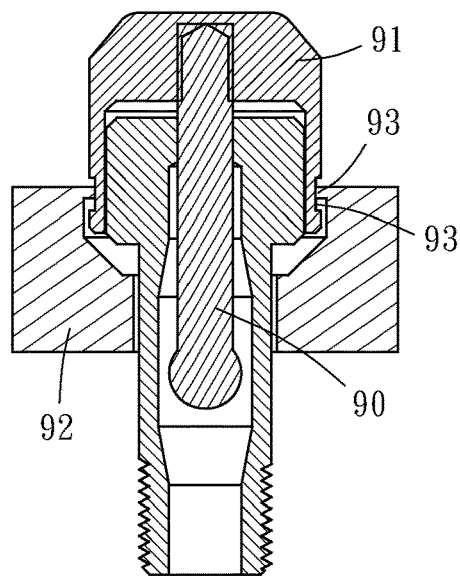
FIG. 44 is a sectional view taken along the line 44-44 in FIG. 43.
Figure 45:
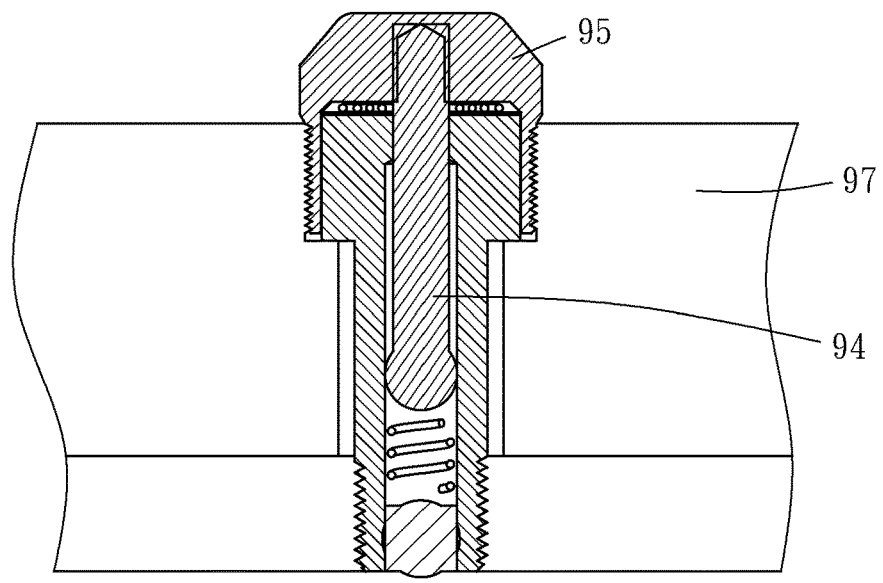
FIG. 45 is a schematic sectional view showing another practical configuration of the tenth preferred embodiment of the present invention.

The handling member provided in the present invention can be not only connected with the connecting member, but also optionally connected with the fastened object. As shown in FIGS. 42-44, the fastener provided by the tenth preferred embodiment of the present invention is characterized in that there are embedding portions 93 corresponding to each other disposed between the head portion 91 of the handling member 90 and the fastened object 92. As shown in FIG. 45, the head portion 95 of the handling member 94 may be provided with an outer thread 96 for being connected with the fastened object 97, which can also attain the technical effect of the present invention.

Figure 46:
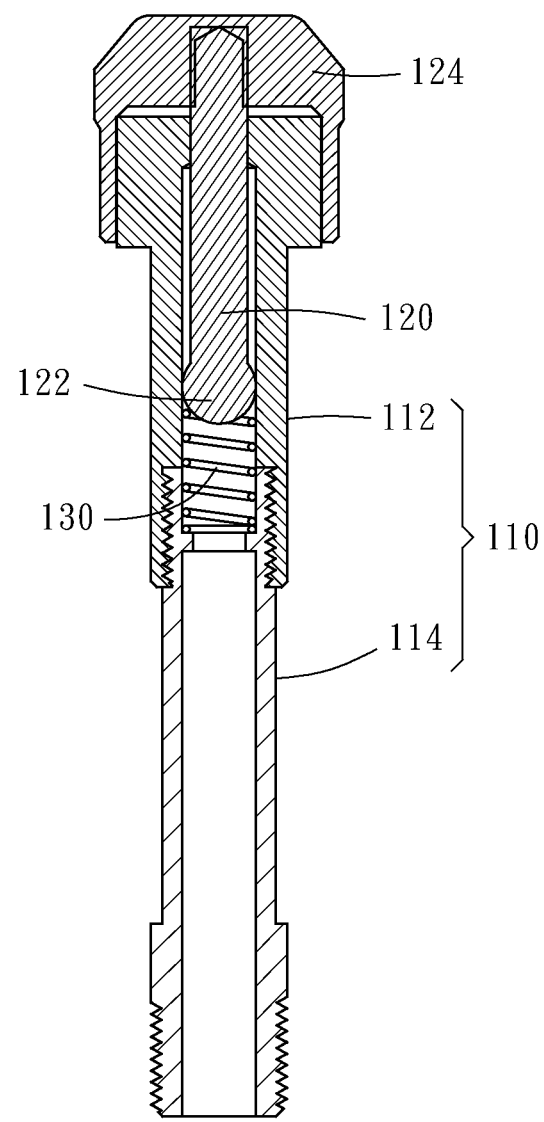
FIG. 46 is a schematic sectional view showing another practical configuration of the present invention.

As shown in FIG. 46, the connecting member 110 may be an assembly of a head section component 112 and an extending section component 114. The handling member 120 is inserted in the head section component 112 of the connecting member 110. There may be an elastic member 130 disposed between the limiting portion 122 of the handling member 120 and the extending section component 114. Of course, the elastic member 130 may be disposed between the head portion 124 of the handling member 120 and the head section component 112 of the connecting member 110, which also has the technical features and effect of the present invention.

Figure 47:
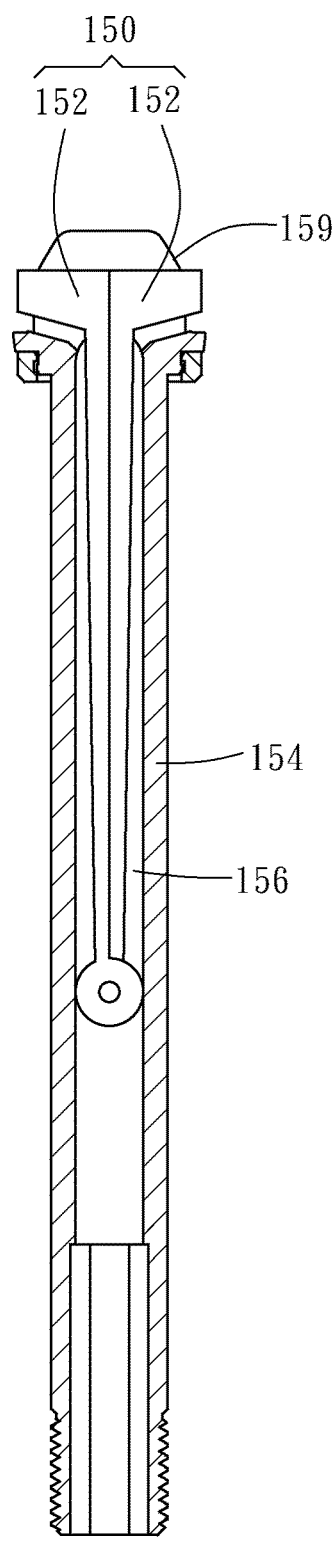
FIGS. 47-49 are sectional views of an eleventh preferred embodiment of the present invention, primarily showing the variation of the condition of the handling member.
Figure 48:
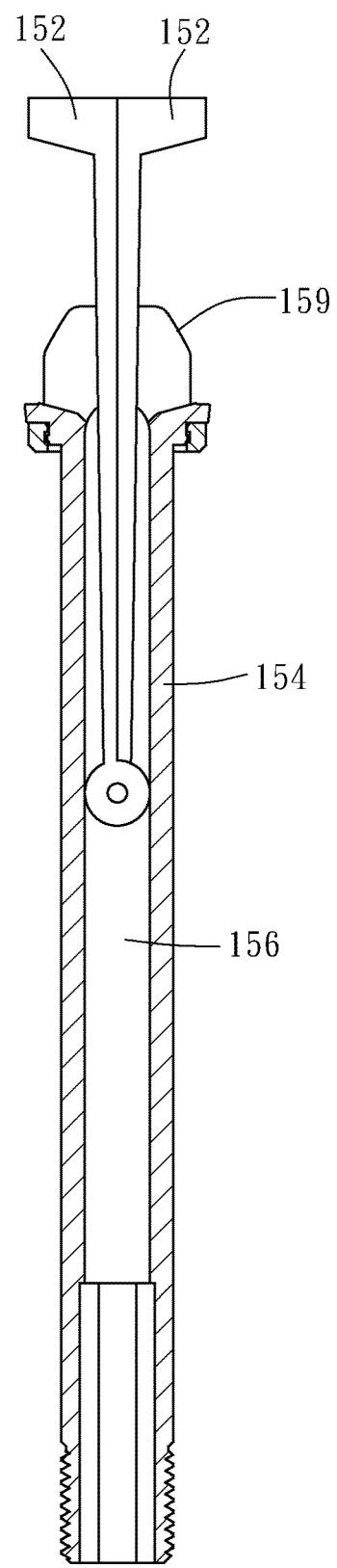
Figure 49:
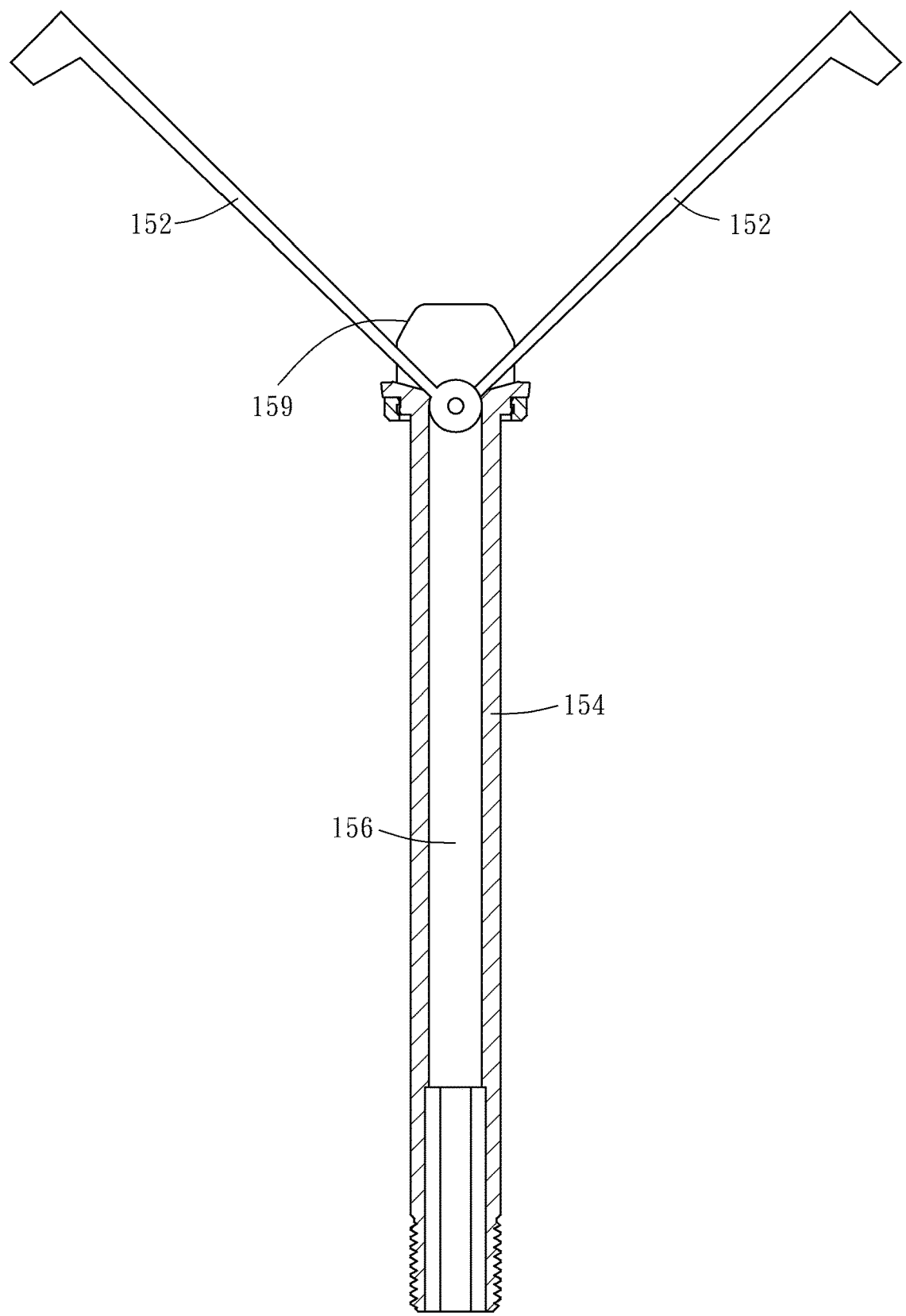
Figure 50:
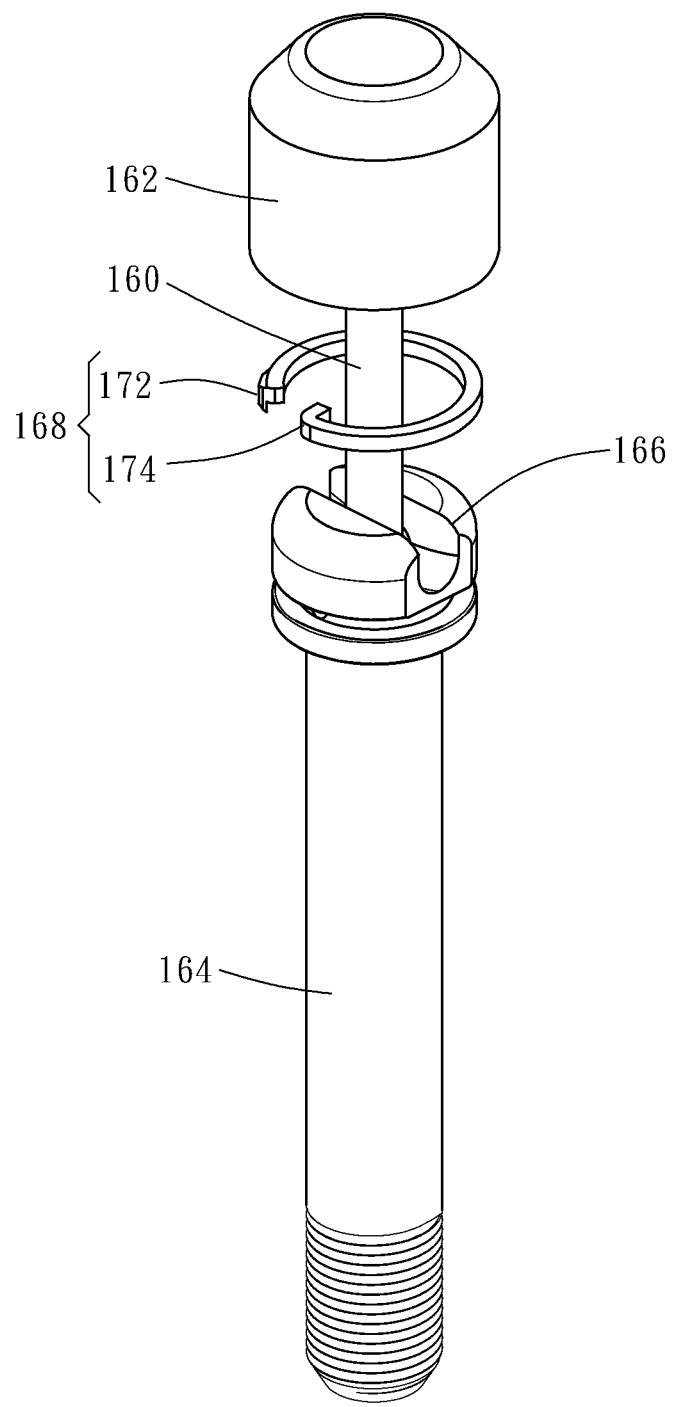
FIG. 50 is a perspective view of a twelfth preferred embodiment of the present invention.
Figures 51, 52:
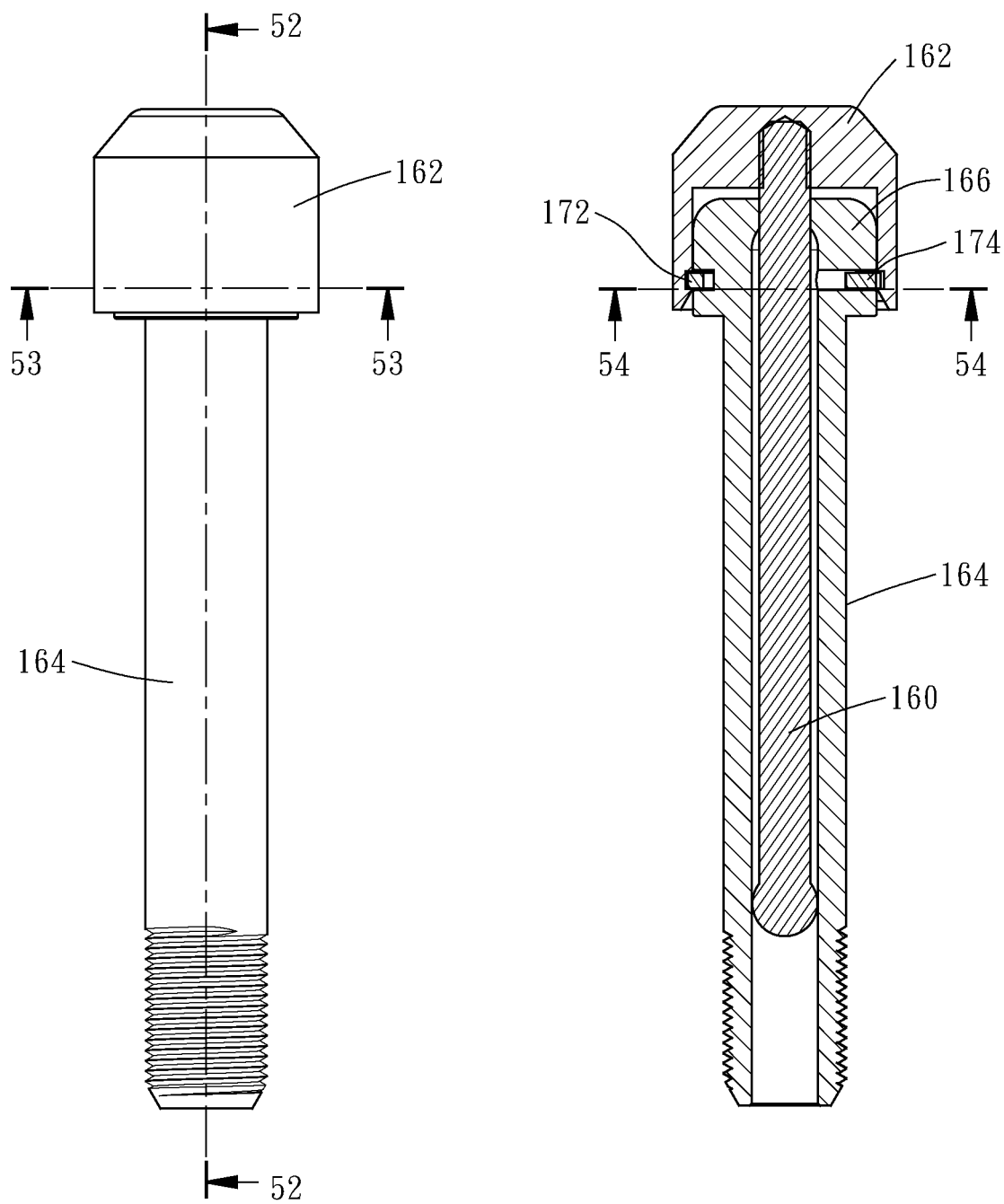
FIG. 51 is a front view of the twelfth preferred embodiment of the present invention.
FIG. 52 is a sectional view taken along the line 52-52 in FIG. 51.
Figure 53:
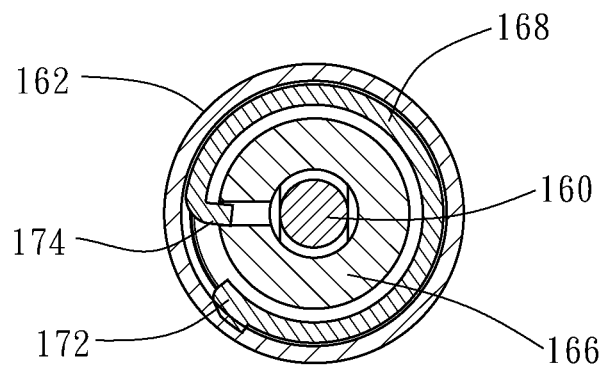
FIG. 53 is a sectional view taken along the line 53-53 in FIG. 51.
Figure 54:
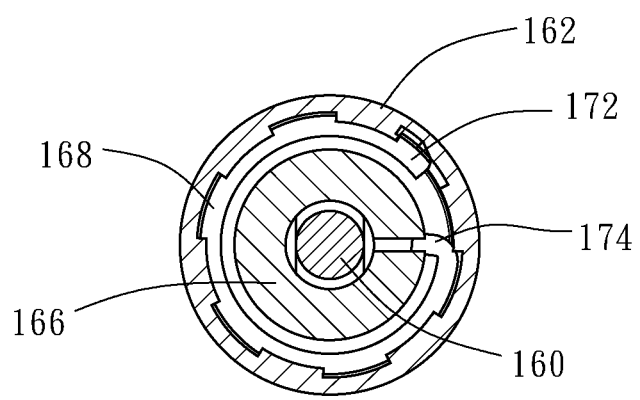
FIG. 54 is a sectional view taken along the line 54-54 in FIG. 52.
Figure 55:
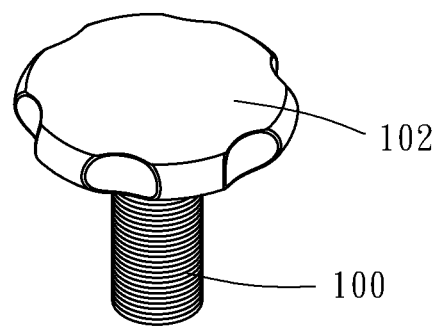
FIGS. 55-56 are schematic views of the conventional fasteners.
Figure 56:
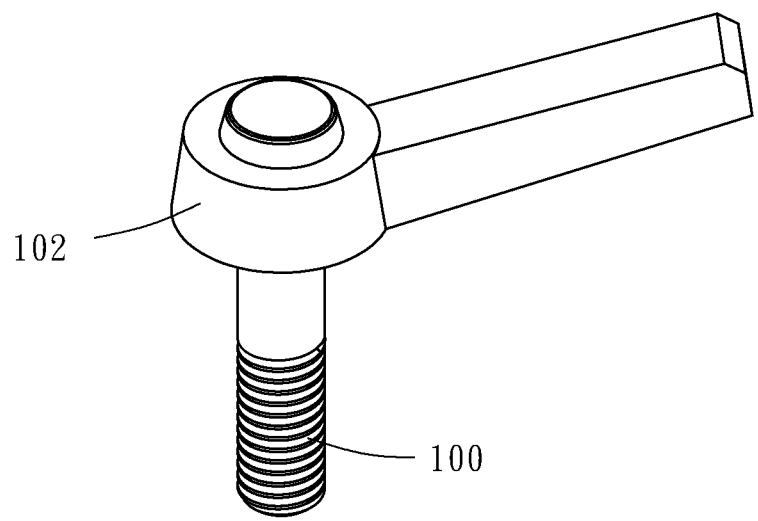

As shown in FIGS. 47-49, if the connecting member needs a relatively larger torque for rotation, the handling member 150 of the fastener provided by the eleventh preferred embodiment of the present invention can be optionally divided into two handles 152 pivotably connected with each other. When the two handles 152 are folded up, they can be received in the accommodating space 156 of the connecting member 154. When the two handles 152 are pulled out of the connecting member 158, they can be unfolded and separated from each other, so that the length, for which the handling ember 150 extends out from the outside of the driven end 159, can be adjusted and modified, and the objective of increasing the rotational moment arm and torque can be attained.

As shown in FIGS. 50-54, the fastener provided by the twelfth preferred embodiment of the present invention is characterized in that a buckling member 168 having elasticity is disposed between the head portion 162 of the handling member 160 and the driven end 166 of the connecting member 164 for being embedded in the driven end 166 of the connecting member 164. In this preferred embodiment, the buckling member 168 is approximately ring-shaped. The buckling member 168 has a positioning end 172 and a free end 174. The positioning end 172 of the buckling member 168 is fixed to the inner wall of the head portion 162. The free end 174 can be connected with or separated from the driven end 166 according to the deflection angle of the head portion 162 relative to the driven end 166. When the head portion 162 of the handling member 160 caps the driven end 166 of the connecting member 164, the driven end 166 directly presses the buckling member 168 to elastically deform, thereby causing the free end 174 of the buckling member embedded in the driven end 166. After that, as long as the head portion 162 is a little rotated, the head portion 162 can deform the buckling member 168 to separate the buckling member 168 from the driven end 166, so that the handling member 160 can be conveniently and quickly detached from the connecting member 164.

Through all the above technical features, the present invention provides the connecting member and the handling member directly disposed in the connecting member and capable of being pulled out and received in the connecting member, thereby attaining the technical effect of being installed and uninstalled without use of an extra tool, convenient usage, and wide applicability.

What is claimed is:

1. A fastener comprising:
a connecting member having a first axis and an accommodating space extended along the first axis; and
a handling member having a second axis and movably disposed in the accommodating space of the connecting member, the handling member being movable between a first position and a second position, when located at the first position, the handling member being disposed in the accommodating space in a way that the second axis is approximately coaxial with the first axis of the connecting member, when located at the second position, the handling member being positioned on the connecting member in a way that an included angle is provided between the second axis and the first axis of the connecting member so that the handling member is capable of being rotated by an external force to drive the connecting member to rotate at a to-be fastened position,
wherein the connecting member is provided at an end thereof with a fastening end and at another end thereof with a driven end; the driven end has a positioning part which is hollow-shaped; when the handling member is located at the second position, the handling member is embedded in the positioning part;
wherein a head portion of the handling member is capable of capping the driven end of the connecting member;
wherein the positioning part transversely penetrates through an outer wall of the driven end to provide at least one breach on the outer wall of the driven end; and
wherein the head portion includes a top portion and a sidewall portion extending downward from the top portion, the sidewall portion has an inner diameter larger than an outer diameter of the outer wall of the driven end of the connecting member, and the sidewall portion is placed radially outward of the outer wall of the driven end of the connecting member and covers the outer wall of the driven end of the connecting member when the handling member is located at the first position.

2. The fastener as claimed in claim 1, wherein the handling member has a limiting portion; the connecting member is integrally formed with a stopping portion located in the accommodating space; the limiting portion is larger in size than an opening on a cross section of the accommodating space at the stopping portion so that the handling member is prevented from being separated from the connecting member.

3. The fastener as claimed in claim 2, wherein the handling member has a movable said limiting portion; after the handling member is pulled out from the connecting member, the limiting portion is located at the stopping portion and enables the handling member to be adjusted in a length thereof, for which the handling member is extended out from an outside of a driven end of the connecting member.

4. The fastener as claimed in claim 1, wherein a hole-closing component is provided in the accommodating space of the connecting member.

5. The fastener as claimed in claim 1, wherein a ratio of a total length of the handling member to a total length of the connecting member is ranged from 0.1 to 4.

6. The fastener as claimed in claim 1, wherein a ratio of an outer diameter of the connecting member to an outer diameter of the handling member is ranged from 1.1 to 5.

7. The fastener as claimed in claim 1, wherein the driven end and the handling member are connected with each other by two embedding portions having concave and convex shapes corresponding to each other; the two embedding portions are capable of being separated from each other or connected with each other by rotational adjustment of an angle of the handling member relative to the driven end, thereby causing the handling member separated from or connected with the connecting member.

* * * * *